(12) United States Patent
Khan et al.

(10) Patent No.: US 7,588,609 B2
(45) Date of Patent: Sep. 15, 2009

(54) FRICTION MATERIAL COMPOSITIONS AND ADDITIVES

(75) Inventors: Mohamed H. Khan, Tucson, AZ (US); Sunil Chandra Jha, Oro Valley, AZ (US)

(73) Assignee: Climax Engineered Materials, LLC, Phoenix, AZ (US)

( * ) Notice: Subject to any disclaimer, the term of this patent is extended or adjusted under 35 U.S.C. 154(b) by 1048 days.

(21) Appl. No.: 10/909,073

(22) Filed: Jul. 30, 2004

(65) Prior Publication Data

US 2006/0025495 A1 Feb. 2, 2006

(51) Int. Cl.
*C09K 3/14* (2006.01)
*C22C 38/16* (2006.01)

(52) U.S. Cl. .......................... 51/309; 310/252; 420/89; 420/93

(58) Field of Classification Search ................ 523/149, 523/152, 155; 420/89, 93; 51/309; 310/252
See application file for complete search history.

(56) References Cited

U.S. PATENT DOCUMENTS

| | | | |
|---|---|---|---|
| 3,967,037 A | 6/1976 | Marzocchi et al. | |
| 4,654,381 A | 3/1987 | Kang et al. | |
| 5,433,774 A | 7/1995 | Kapl et al. | |
| 5,474,159 A | 12/1995 | Soennecken et al. | |
| 5,501,728 A | 3/1996 | Shepley et al. | |
| 5,576,369 A * | 11/1996 | Kudo et al. | 524/413 |
| 6,060,008 A | 5/2000 | Czarnowski et al. | |
| 6,481,555 B1 | 11/2002 | Hell et al. | |
| 6,506,482 B1 * | 1/2003 | Burton et al. | 428/293.4 |
| 2003/0024608 A1 | 2/2003 | Cooper | |

FOREIGN PATENT DOCUMENTS

JP 01320329 A * 12/1989

OTHER PUBLICATIONS

Full English-language translation of JP 01-320329, Dec. 26, 1989.*
Carley, Larry, "Application-Specific Friction Is Hotter Than Ever," Brake & Front End, (Mar. 2001), 6 pages, http://www.babcox.com/editorial/bf/bf30134.htm.
Reliance Electric DC Motor Brush Life White Paper—C-7090, "DC Motor Brush Life," DC Motors, (Copyright 2001), 10 pages, http://www.reliance.com/prodserv/motgen/c7090.

* cited by examiner

*Primary Examiner*—Vickey Nerangis
(74) *Attorney, Agent, or Firm*—Fennemore Craig, P.C.

(57) ABSTRACT

The claimed invention involves a novel composition of matter comprising a mixture of Fe—Mo Intermetallic and copper oxide. A novel composition of matter of Fe—Mo Intermetallic, copper oxide and calcium carbonate is also claimed. The claimed invention also involves a novel friction lining additive comprising Fe—Mo Intermetallic and copper oxide for improved braking effectiveness. Fe—Mo Intermetallic, copper oxide and calcium carbonate may also be used as a friction lining additive according to the present invention. The claimed invention also includes a novel motor brush comprising Fe—Mo Intermetallic and copper oxide for improved wear. Fe—Mo Intermetallic, copper oxide and calcium carbonate may also be used as a motor brush additive according to the present invention.

10 Claims, 22 Drawing Sheets

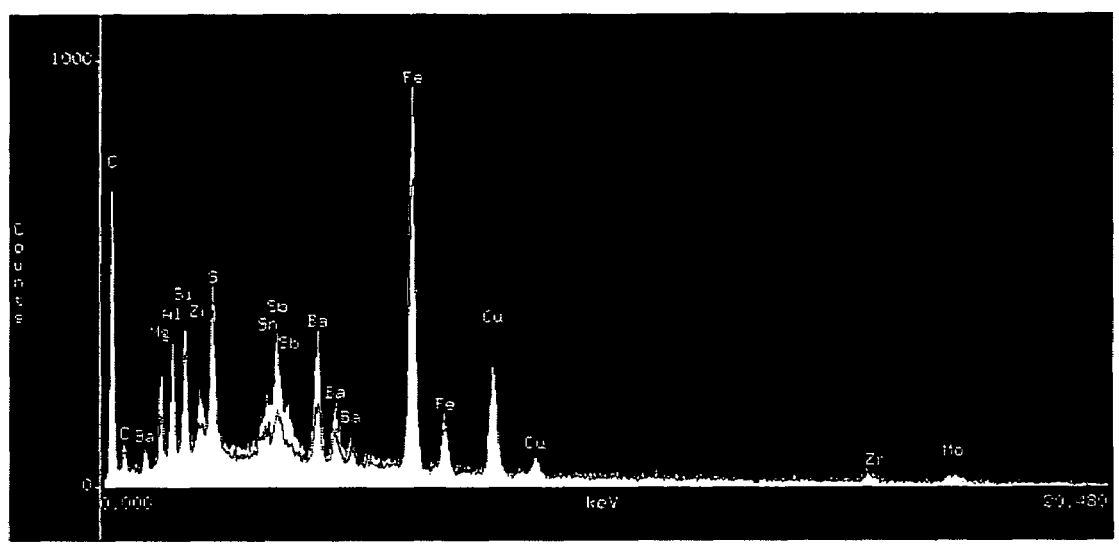
FIG. 7c
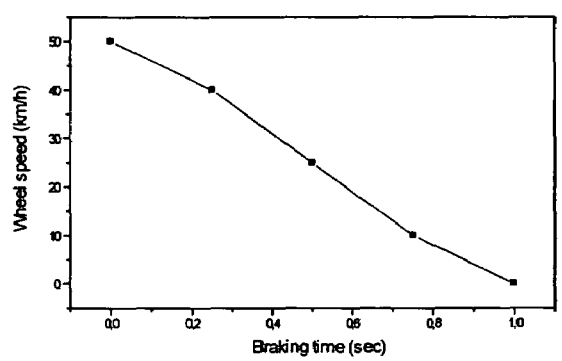 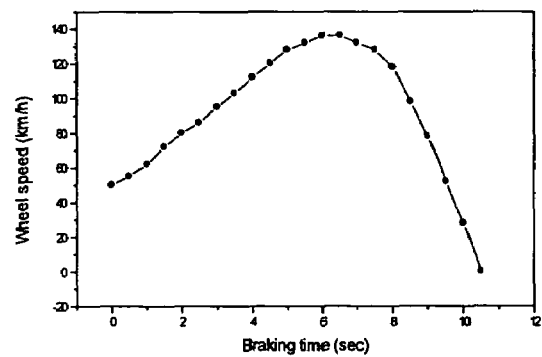
FIG. 8a	FIG. 8b

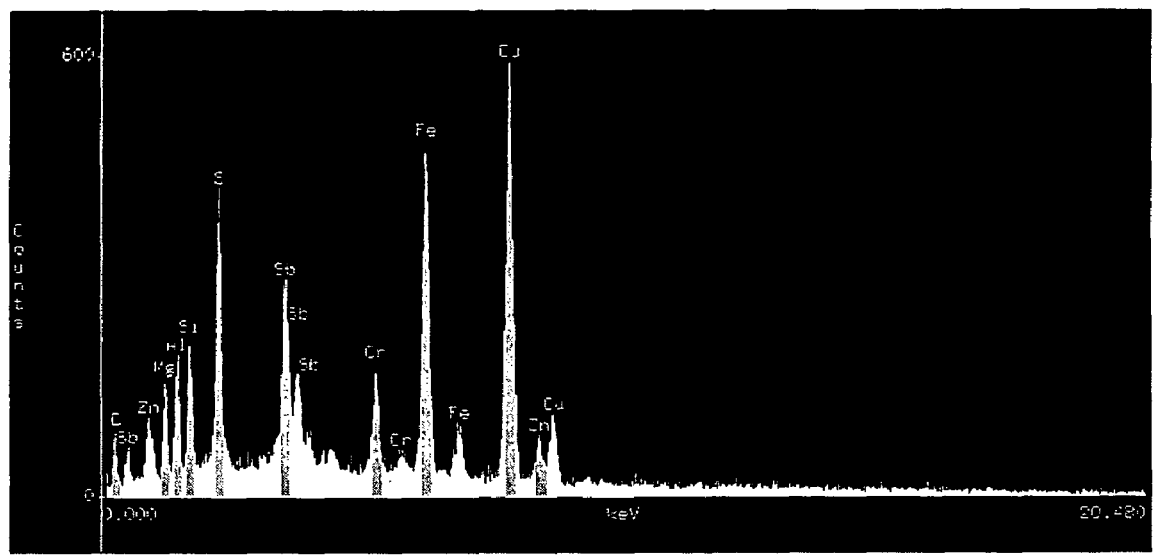
FIG. 14
 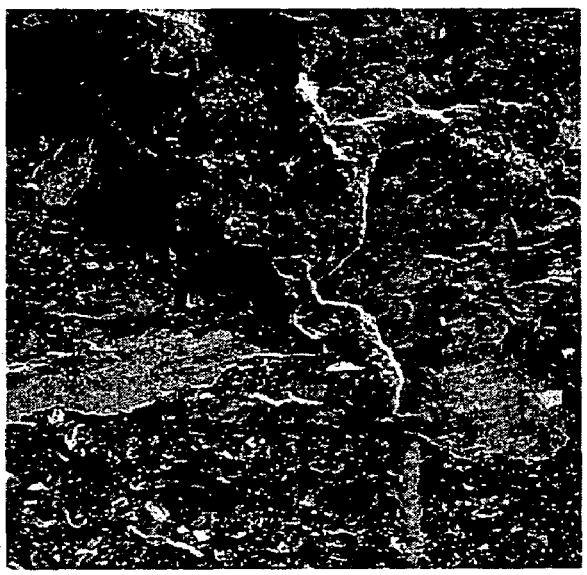
FIG. 15a                FIG. 15b

FRICTION MATERIAL COMPOSITIONS AND ADDITIVES

TECHNICAL FIELD

This invention relates to friction linings in general and more specifically, to friction material compositions having improved performance and additives for the friction materials.

BACKGROUND OF THE INVENTION

Friction linings are well known. Their primary purpose is to decelerate and stop a vehicle by transforming the kinetic energy of the system into heat via friction and then dissipating the heat to the surroundings. In a clutch, the primary purpose is to hold the torque put out by the engine. Other aspects of friction linings that impact overall brake performance are coefficient of friction, fade, effectiveness (braking time and speed), thermal stability and wear.

Until recently, use of asbestos in friction linings was widespread. It is well known that asbestos has many positive characteristics as a friction lining additive due to its ability to control heat, regenerate the friction surface and wear well. However, given the health hazards associated with asbestos fibers, friction material suppliers and vehicle manufacturers have shifted away from use of asbestos in friction linings. Thus, there has been a need to develop other friction lining compositions that exhibit the beneficial characteristics of asbestos, but without its use.

Generally speaking, friction linings are composites of many different materials that fulfill the functions of friction materials, abrasives, fillers, lubricants and binders. As is well known, slight changes in additive constituents and concentrations can greatly affect friction lining performance. For example, changing one additive may enhance wear but reduce braking effectiveness. Thus, an objective in developing friction lining compositions may be to find the best overall combination that achieves good performance in terms of coefficient of friction, effectiveness, fade, thermal stability and wear, depending on the specific application.

SUMMARY OF THE INVENTION

The following summary is provided as a brief overview of the claimed composition. It shall not limit the invention in any respect, with a detailed and fully enabling disclosure being set forth in the Detailed Embodiments of the Invention section. Likewise, the invention shall not be restricted in any numerical parameters, processing equipment, chemical reagents, ingredients, operations conditions or other variables unless otherwise stated herein.

Embodiments of a friction lining may comprise an additive of a blend of Fe—Mo Intermetallic, copper oxide (Blend A) that comprises about 1 to about 20 wt. % of the friction lining composition.

Other embodiments of a friction lining may comprise an additive of a blend of Fe—Mo Intermetallic, copper oxide and calcium carbonate (Blend B) that comprises about 1 to about 20 wt. % of the friction lining composition.

Still more embodiments of a friction lining may comprise at least one friction material, at least one abrasive, at least one filler, at least one binder and an additive comprising Fe—Mo Intermetallic and copper oxide. Other embodiments of a friction lining may comprise at least one friction material, at least one abrasive, at least one filler, at least one binder and an additive comprising Fe—Mo Intermetallic, copper oxide and calcium carbonate.

In still more embodiments, the Fe—Mo Intermetallic and copper oxide composition of the present invention (Blend A) may be added to motor brushes in an amount comprising about 1 to about 10 wt. %. Fe—Mo Intermetallic, copper oxide and calcium carbonate (Blend B) may be added to motor bushes in an amount comprising about 1 to about 10 wt. %.

BRIEF DESCRIPTION OF THE FIGURES

The accompanying figures, which are incorporated herein and form a part of the specification, illustrate various embodiments of the present invention and together with the description, serve to explain the invention. In the figures:

FIG. 1 shows the coefficients of friction over time from FAST friction testing of the OE-A baseline friction lining and Examples 1-4.

FIG. 5 shows performance data from J2430 testing of the OE-A baseline and Example 2.

FIG. 6 shows performance data from AO4D testing of OE-A baseline friction lining and Example 2.

FIG. 7 shows SEM and EDX images of friction layers after fade snubs in J2430 testing.

FIG. 7c shows EDX analysis of the chemical composition of the friction layers of the OE-A baseline and Example 2 after fade snubs. OE-A baseline values are superimposed and appear at the dark line and below.

FIG. 8 shows wheel speed as a function of time for the baseline OE-B friction lining.

FIG. 8a shows wheel speed as a function of time for the baseline OE-B friction lining in normal conditions.

FIG. 8b shows wheel speed as a function of time for the baseline OE-B friction lining at 6° C., 87% relative humidity and when $MgCl_2$ was applied to the disc.

FIG. 9 shows the coefficients of friction as a function of time for the OE-B and LM baseline samples and for Examples 5-8.

FIG. 10 shows the performance data from J2430 testing of the baseline OE-B and LM samples and Examples 5-8.

FIG. 13 shows SEM images of the friction surface of OE-B friction linings after J2430 testing.

FIG. 14 shows the chemical composition of the friction layer of OE-B friction lining after J2430 testing.

FIG. 15 shows SEM images of Examples 6 and 8 after friction testing at 6° C., 87% relative humidity and when $MgCl_2$ was applied to the disc.

FIG. 15a shows a back-scattered SEM image of the friction surface of Example 6 when subjected to friction testing at 6° C., 87% relative humidity and when $MgCl_2$ was applied to the disc.

FIG. 15b shows a back-scattered SEM image of the friction surface of Example 6 when subjected to friction testing at 6° C., 87% relative humidity and when $MgCl_2$ was applied to the disc.

FIG. 16 shows the chemical composition of friction layers of Examples 6 and 8 after friction testing at 6° C., 87% relative humidity and when $MgCl_2$ was applied to the disc.

DETAILED EMBODIMENTS OF THE INVENTION

Figure 1A:
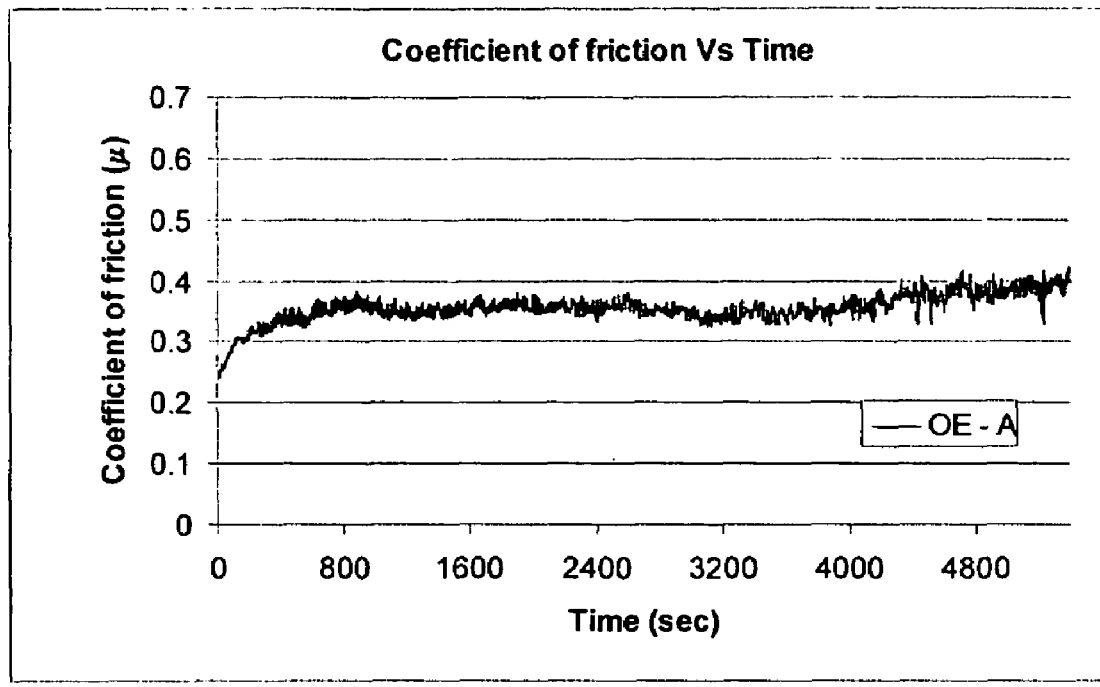
FIG. 1a shows the coefficient of friction as a function of time from FAST friction testing of the OE-A baseline friction lining.
Figure 1B:
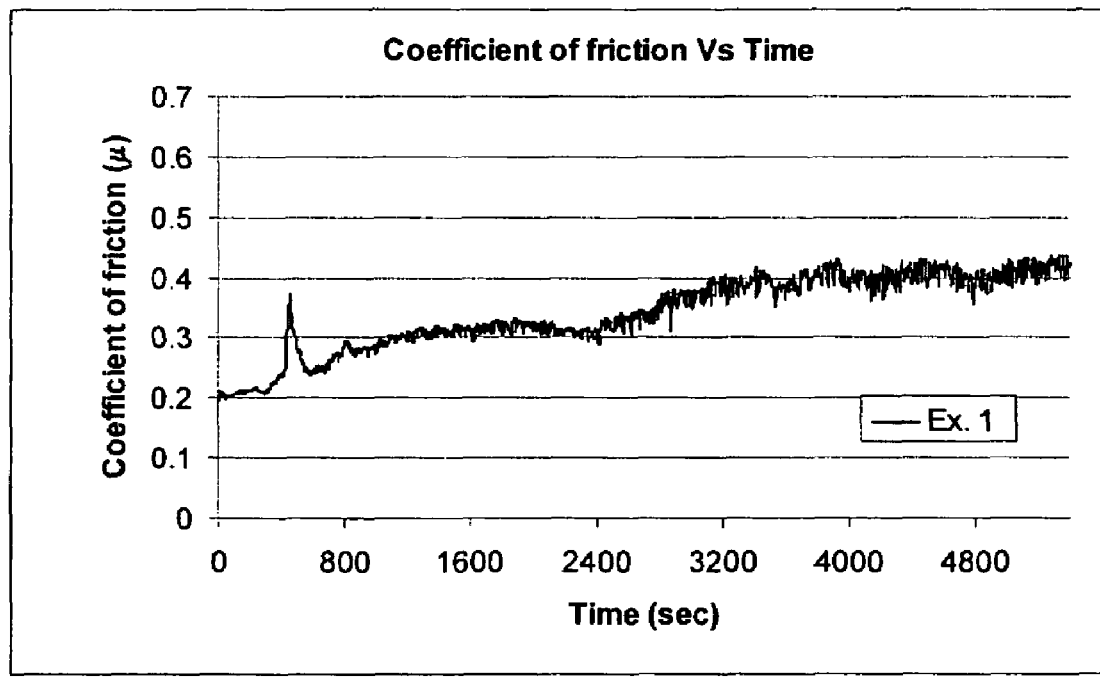
FIG. 1b shows the coefficient of friction as a function of time from FAST friction testing of Example 1.
Figure 1C:
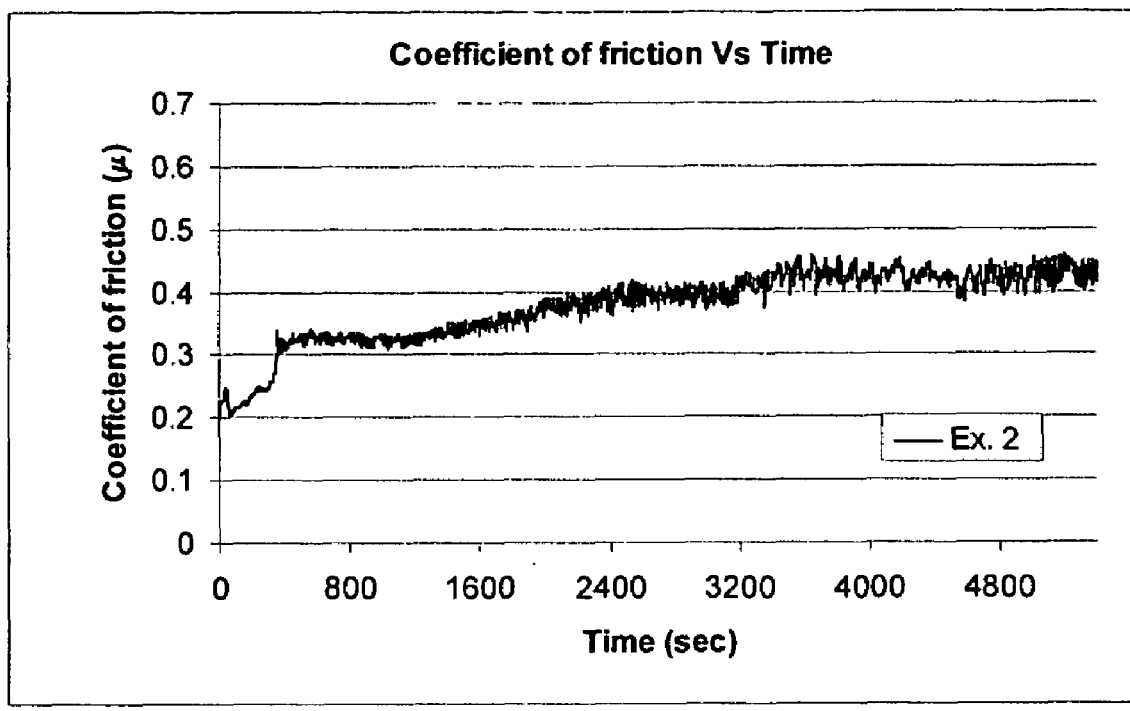
FIG. 1c shows the coefficient of friction as a function of time from FAST friction testing of Example 2.
Figure 1D:
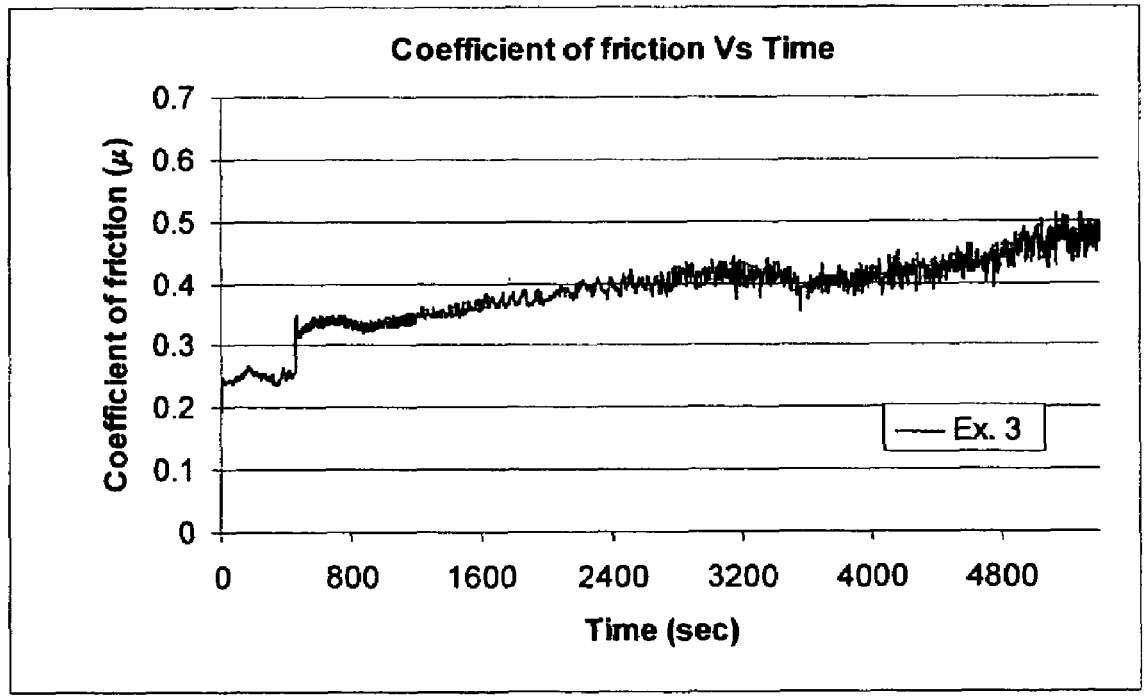
FIG. 1d shows the coefficient of friction as a function of time from FAST friction testing of Example 3.
Figure 1E:
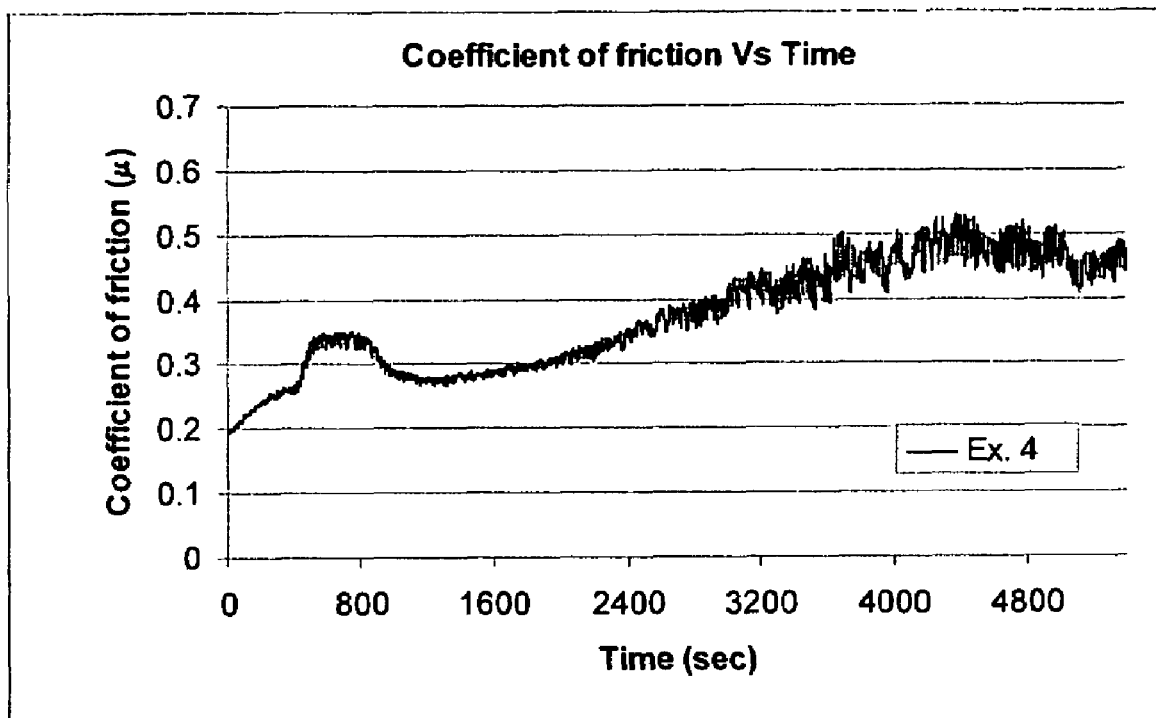
FIG. 1e shows the coefficient of friction as a function of time from FAST friction testing of Example 4.

Broadly described, embodiments of friction linings according to the present invention may comprise a friction material and an additive comprising Fe—Mo Intermetallic and copper oxide (Blend A). In other embodiments, the additive comprises Fe—Mo Intermetallic, copper oxide and calcium carbonate (Blend B). In Blend A and Blend B, the Fe—Mo Intermetallic may comprise about 50 to about 75 wt. % Mo, with the remainder comprising Fe. The Fe—Mo Intermetallic preferred composition comprises about 55 to about 73 wt. % Mo, more preferably about 59 to about 70 wt. % Mo, with the remainder comprising Fe. "Friction materials" generally include one or more metals, metal sulfides, metal oxides, aramid fibers, graphite, coke, vermiculite, chromite, Kevlar or ceramics. The terms, "abrasives," "fillers," and "binders," are well known in the art and will be given their customary meaning according to the understanding of one of ordinary skill in the art. "Abrasives" generally include one or more of the following: zircon, zirconium silicate, alumina, magnesia, iron oxide, tin oxide or quartz. "Fillers" generally include one or more of the following: barium sulfate, calcium carbonate, lime, potassium titanate, rubber zinc oxide, cashew dust or fibers. "Binders" generally include phenolic resin and modified resins, such as cresol, epoxy, cashew, rubber, linseed oil or boron. Many embodiments are described herein; however, whether one is considered preferred over another depends on the desired performance criteria. For example, if a stable, high coefficient of friction in a dry environment were required, one might consider one embodiment to be preferred over another. On the other hand, if increased braking effectiveness were required in a cold, wet and salty environment, another embodiment may be considered preferred.

A first embodiment of an additive according to the present invention comprises Fe—Mo Intermetallic and copper oxide. The first embodiment of the additive may be added to a friction lining in an amount of about 1 wt. % to about 20 wt. %, and more preferably in an amount of at least about 2 to 10 wt. % based on overall performance under dry conditions. The first embodiment of an additive may comprise between about 60 and about 99 wt. % Fe—Mo Intermetallic and between about 1 and about 40 wt. % copper oxide. Alternatively, it may comprise between about 90 and about 99 wt. % Fe—Mo Intermetallic and between about 1 and about 10 wt. % copper oxide, more preferably about 95 wt. % Fe—Mo Intermetallic and about 5 wt. % copper oxide. A second embodiment of an additive according to the present invention comprises Fe—Mo Intermetallic, copper oxide and calcium carbonate. The additive of the second embodiment may be present in a friction lining in an amount of about 2 wt. % (e.g., 1.912 wt. %) to about 10 wt. % (e.g., 9.56 wt. %). The second embodiment of an additive may comprise between about 50 and about 99 wt. % Fe—Mo Intermetallic, between about 1 and about 50 wt. % copper oxide, and between about 1 and about 10 wt. % calcium carbonate. Alternatively, it may comprise between about 80 and about 95 wt. % Fe—Mo Intermetallic, between about 5 and about 15 wt. % copper oxide and between about 1 and about 5 wt. % calcium carbonate, more preferably about 90 wt. % Fe—Mo Intermetallic, about 5 wt. % copper oxide, and about 5 wt. % calcium carbonate.

In one embodiment, the Fe—Mo Intermetallic, copper oxide and calcium carbonate may be provided in powder form and combined in varying amounts to produce the embodiments described herein. The particles of Fe—Mo Intermetallic may range in size from 2 μm to 200 μm. The particles of copper oxide may range in size from 2 μm to 200 μm; and the particles of calcium carbonate may range in size from 1 μm to 100 μm. The particle size range for the first embodiment of the invention was 10 μm to 200 μm. The average particle size for the second embodiment of the invention was 5 μm to 200 μm. The powdered constituents (e.g. Fe—Mo Intermetallic, copper oxide and calcium carbonate) may be produced by a variety of processes known in the art. By way of example, Fe—Mo Intermetallic, copper oxide and calcium carbonate are available commercially from Climax Engineered Materials of Sahuarita, Ariz.

Friction lining additives comprising Fe—Mo Intermetallic and copper oxide lead to improved brake performance in terms of fade, hardness, strength, wear resistance, and thermal stability. Friction lining additives comprising Fe—Mo Intermetallic, copper oxide and calcium carbonate lead to improved braking effectiveness (e.g., shorter braking times and lower wheel speeds), in addition to reduced brake lining wear. It is believed that these performance enhancements result from the catalytic effect of the Fe—Mo Intermetallic and copper oxide additives on the curing process of the binder, in one embodiment, phenolic resin, which represents a matrix of composite materials. It is believed that this curing process results in the formation of a specific friction layer containing Fe—Mo Intermetallic and copper oxide, which can also be linked to improved fade performance. A number of embodiments of friction lining compositions according to the present invention were made and tested under a variety of conditions. To the extent that one embodiment performed better than any other embodiment may be as a result of the specific test conditions.

In one embodiment of the present invention, the composition of a first original equipment (OE-A) brake friction lining was modified to substitute an additive comprising Fe—Mo Intermetallic and copper oxide powders for some of the steel chip present in the original formulation, such that the additive comprising Fe—Mo Intermetallic and copper oxide comprised about 4 wt. % and the steel chip comprised about 6 wt. %. In this embodiment, the additive comprised about 95 wt. % Fe—Mo Intermetallic and 5 wt. % copper oxide. The additive comprised Fe—Mo Intermetallic and copper oxide powders having an average particle size of about 200 μm to 2 μm. Various embodiments of a friction lining composition according to the present invention were made by a process well known to those of ordinary skill in the art. First, the various components for the overall composition were weighed and mixed. Then, the friction lining composition was placed into a mold, pressed and cured. Finally, the composition was then subjected to post-curing and machining processes. Once made, the friction lining composition was then subjected to a series of brake performance tests. As compared to the unmodified OE-A brake friction lining, the addition of about 4 wt. % of the additive comprising Fe—Mo Intermetallic and copper oxide resulted in increased thermal stability, increased hardness and shear strength, a stable coefficient of friction, decreased fade and decreased wear.

In other embodiments, the additive comprising Fe—Mo Intermetallic and copper oxide may comprise about 2 wt. % of the OE-A brake friction lining composition, with steel chip comprising about 8 wt. %. In this embodiment, the additive comprised about 95 wt. % Fe—Mo Intermetallic and about 5 wt. % copper oxide. The additive comprising Fe—Mo Intermetallic and copper oxide powders had particle sizes in the range of about 200 μm to 2 μm. As compared to the unmodified OE-A brake friction linings, although it resulted in a lower coefficient of friction, adding about 2 wt. % of the additive comprising Fe—Mo Intermetallic and copper oxide in place of about 2 wt. % of steel chip resulted in slight increases in hardness and shear strength and decrease in wear.

Other embodiments may comprise an additive of Fe—Mo Intermetallic and copper oxide powders to the OE-A brake friction lining composition such that the Fe—Mo Intermetallic and copper oxide additives comprise about 6 wt. % and steel chip comprises about 4 wt. %. In this embodiment, the additive comprised about 95 wt. % Fe—Mo Intermetallic and about 5 wt. % copper oxide, the additive having particle sizes in the range of about 200 μm to 2 μm. As compared to the unmodified OE-A friction lining composition, replacing about 6 wt. % of steel chip with about 6 wt. % of the additive comprising Fe—Mo Intermetallic and copper oxide resulted in increased hardness and sheer strength. The coefficient of friction increased slightly and then reached a stabilized value close to 0.4μ.

In another embodiment, an additive comprising Fe—Mo Intermetallic and copper oxide powders may comprise about 10 wt. % of a modified OE-A brake friction lining composition, completely replacing the steel chip component of the original formulation. In this embodiment, the additive comprised about 95 wt. % Fe—Mo Intermetallic and about 5 wt. % copper oxide. The additive comprised Fe—Mo Intermetallic and copper oxide powders having particle sizes in the range of about 2 μm to 200 μm. As compared to the original composition of the OE-A friction lining, although wear was slightly higher, the substitution of about 10 wt. % of a Fe—Mo Intermetallic and copper oxide additive for the steel chip of the original formulation resulted in increased thermal stability, increased hardness and shear strength, and an increased coefficient of friction.

In still other embodiments, the composition of a second OE brake friction lining (OE-B) was modified to substitute an additive comprising Fe—Mo Intermetallic, copper oxide and calcium carbonate for about 10% of the carbonaceous matter in the original formulation. The carbonaceous matter in the original formulation comprised graphite and coke, making up about 19.12 wt. % of the original formulation. Thus, replacing 10% of the carbonaceous material with Fe—Mo Intermetallic-copper oxide-calcium carbonate additives means that the Fe—Mo Intermetallic-copper oxide-calcium carbonate additives comprised about 2 wt. % (e.g., 1.912 wt. %). The additive comprised about 93 wt. % Fe—Mo Intermetallic, about 5 wt. % copper oxide, and about 2 wt. % calcium carbonate, having particle sizes in the range of about 2 μm to 200 μm.

As in the case of the embodiments previously discussed, the friction lining compositions according to the next embodiments were made by a process familiar to those of ordinary skill in the art. As already explained above, the individual constituents for the overall composition were weighed and mixed. The mixture was then molded, pressed, cured, post-cured and then machined.

In baseline testing, the OE-B brake friction lining exhibited a significant increase in braking time in a cold, wet environment when subjected to chlorine ions (from magnesium chloride and sodium chloride type salts used on roads during the winter). As compared to the OE-B brake friction lining, the embodiment of the present invention comprising about 2 wt. % (e.g., 1.912 wt. %) of a Fe—Mo Intermetallic-copper oxide-calcium carbonate additive exhibited a lower average coefficient of friction, but better braking effectiveness (shorter braking time and lower speeds), lower wear, lower speed sensitivity, and better fade and recovery properties.

In yet another embodiment, about 50% of the carbonaceous material from the composition of the OE-B brake friction lining was replaced with an additive comprising Fe—Mo Intermetallic, copper oxide and calcium carbonate.

Since the carbonaceous material comprised about 19.12 wt. % of the original formulation, replacing about 50% of it with a Fe—Mo Intermetallic-copper oxide-calcium carbonate additive means that the Fe—Mo Intermetallic-copper oxide-calcium carbonate additives comprised about 10 wt. % (e.g., 9.56 wt. %). The additive comprised about 93 wt. % Fe—Mo Intermetallic, about 5 wt. % copper oxide, and about 2 wt. % calcium carbonate, having particle sizes in the range of about 2 µm to 200 µm. As compared to the OE-B brake friction lining, the embodiment of the present invention comprising about 10 wt. % (e.g., 9.56 wt. %) of a Fe—Mo Intermetallic-copper oxide-calcium carbonate additive exhibited a slightly lower average coefficient of friction, but better braking effectiveness (shorter braking time and lower speeds), lower wear, lower speed sensitivity, and better fade and recovery properties.

In still other embodiments, the composition of the OE-B brake friction lining was modified to substitute an additive comprising Fe—Mo Intermetallic and copper oxide for about 10% of the carbonaceous matter in the original formulation. Since the carbonaceous material comprised about 19.12 wt. % of the original formulation, replacing about 10% of it the carbonaceous material with a Fe—Mo Intermetallic-copper oxide additive means that the Fe—Mo Intermetallic-copper oxide additives comprised about 2 wt. % (e.g., 1.912 wt. %). The additive comprised about 95 wt. % Fe—Mo Intermetallic and about 5 wt. % copper oxide, having particle sizes in the range of about 2 µm to 200 µm. As compared to the OE-B brake friction lining, this embodiment of the present invention exhibited a slightly lower coefficient of friction and lower wear and speed sensitivity, but better fade and recovery properties.

Yet another embodiment comprised replacing about 50% of the carbonaceous material in the OE-B brake friction lining with a Fe—Mo Intermetallic-copper oxide additive according to the present invention. Since the carbonaceous material comprised about 19.12 wt. % of the OE-B brake friction lining, replacing about 50% of it means that the weight percent of the Fe—Mo Intermetallic-cooper oxide additives was about 10 wt. % (e.g., 9.56 wt. %). The additive comprised about 95 wt. % Fe—Mo Intermetallic and about 5 wt. % copper oxide, having particle sizes in the range of about 2 µm to 200 µm. As compared to the OE-B brake friction lining, the embodiment of the present invention comprising about 10 wt. % (e.g., 9.56 wt. %) of a Fe—Mo Intermetallic-copper oxide additive exhibited a slightly lower coefficient of friction and higher speed sensitivity, but lower wear and better fade and recovery properties.

In order to provide further information regarding the invention, the following examples are provided. The examples presented are not intended to limit the invention in any respect:

EXAMPLES 1-4

In Examples 1-4, a first OE brake friction lining, OE-A, was modified by replacing some or all of the steel chip component of the OE-A lining material with an additive of Fe—Mo Intermetallic and copper oxide powders according to the present invention. The various components for the overall friction lining of Examples 1-4 were weighed, mixed, molded, pressed and cured. Then the compositions were subjected to post-curing and machining processes. The OE-A brake linings and the formulations containing Fe—Mo Intermetallic and copper oxide powders were subjected to a variety of brake performance tests that are well known in the art.

The OE-A brake linings were analyzed to identify the constituents present and their quantities. The tests used for this purpose were light microscopy (LM), x-ray diffraction (XRD), scanning electron microscopy (SEM) equipped with an energy dispersive microanalysis (EDX), and Fourier transform infrared analysis (FTIR). These techniques are well-known techniques for materials characterization.

All samples for LM, XRD, SEM and EDX were sectioned carefully into 15×15×10 mm segments. The segments were then embedded into an epoxy resin holder and were ground and polished. These were used for qualitative and quantitative analyses. FTIR was used for the qualitative analysis. Quantitative analysis (using image analysis) was based on the fact that the total area covered by a selective phase (for example, coke) on a randomly performed cut is proportional to the volume content of this phase. Statistical analysis was applied to the experiment design and to evaluation of results. Measured data correspond to a confidence of about 90% and an accuracy of ±10% within the given value.

Table 1 lists the detected constituents in the OE-A friction lining formulation, which served as a baseline for performance testing of Examples 1-4. The total amount of metallic particles in this friction lining is about 20 wt. %. In addition, this friction lining contains abrasives (zircon, alumina, magnesia) and lubricants (graphite, coke, vermiculite and molybdenum sulfide). Barites are a filler and Twaron (aramid fiber) functions to support the strength and rubber damping of the friction lining.

TABLE 1

Analyzed constituents in OE-A

| Constituent | Content (wt. %) |
| --- | --- |
| Steel chip | 10 |
| Iron powder | 3 |
| Graphite | 10 |
| Coke | 15 |
| Vermiculite | 5 |
| Zircon | 2 |
| Rubber | 5 |
| Twaron | 2 |
| Barites | 9 |
| Copper chip | 4 |
| Magnesia | 3 |
| Tin | 3 |
| $MoS_2$ | 1 |
| $Al_2O_3$ | 1 |
| Phenolic resin | 24 |

In Examples 1-4, some or all of the steel chip component of the OE-A friction lining was replaced by an additive of Fe—Mo Intermetallic and copper oxide powders according to the present invention. The Fe—Mo Intermetallic-copper oxide additives comprised about 95 wt. % Fe—Mo Intermetallic and about 5 wt. % copper oxide. The additive comprised Fe—Mo Intermetallic and copper oxide powders having particle sizes in the range of about 2 µm to 200 µm. In Example 1, about 2 wt. % of the steel chip was replaced with about 2 wt. % of Fe—Mo Intermetallic-copper oxide additives. In Example 2, about 4 wt. % of the steel chip was replaced with about 4 wt. % of Fe—Mo Intermetallic-copper oxide additives. In Example 3, about 6 wt. % of the steel chip was replaced with about 6 wt. % Fe—Mo Intermetallic-copper oxide additives. And, in Example 4, about all of the steel chip was replaced with about 10 wt. % Fe—Mo Intermetallic-copper oxide additives.

Each of Examples 1-4 and the baseline OE-A friction linings were subjected to a variety of friction lining performance tests; however, not all of the Examples were subjected to all of the tests, as set forth below. Each of the tests performed is broadly described as follows:

The Friction Assessment and Screening Test (FAST) was developed by Ford Motor Company in the 1960's and is used to measure coefficient of friction. Small specimens, about 6.35 mm square are pressed against a rotating cast iron disc for 90 minutes. Temperature is increased exponentially from room temperature to about 300° C. Tests were carried out using a Link Engineering FAST machine.

Thermogravimetric analysis was performed to evaluate the thermal stability of the samples. In addition tests were also performed to ascertain the Brinell hardness, sheer strength and swell and growth of the samples. Noise testing J2521 was also performed.

The J2430 test procedure was also used for full-scale dynamometer testing. J2430 testing, which is recommended by the Society of Automotive Engineers (SAE), compares friction linings to Federal Motor Vehicle Safety Standard (FMVSS) 135 minimum brake performance standards for new brakes. This test measures instrument check stop, burnish, effectiveness, fade, hot performance, cooling, recovery, reburnish and wear. AO4D testing was also used to test for fade and wear. A Link Engineering dynamometer was used for this testing.

After friction testing, the friction lining samples were inspected using LM, XRD, SEM and EDX.

Fast

The baseline OE-A friction lining, as well as Examples 1-4, were subjected to FAST testing. FIGS. 1a-e show the coefficient of friction measured as a function of time. As compared to the baseline OE-A friction lining, Examples 1-4 exhibited a lower coefficient of friction initially. Although these Examples exhibited transient behavior at about between 400 and 800 seconds, the coefficient of friction increased and stabilized in the final stages of testing when the temperature increased. Initial changes of the coefficient of friction can be related to development of contact between the brake lining samples and the rotating disc. The transients are believed to be a consequence of the development of a stable friction layer on the surface of the samples for Examples 1-4.

Figure 2:
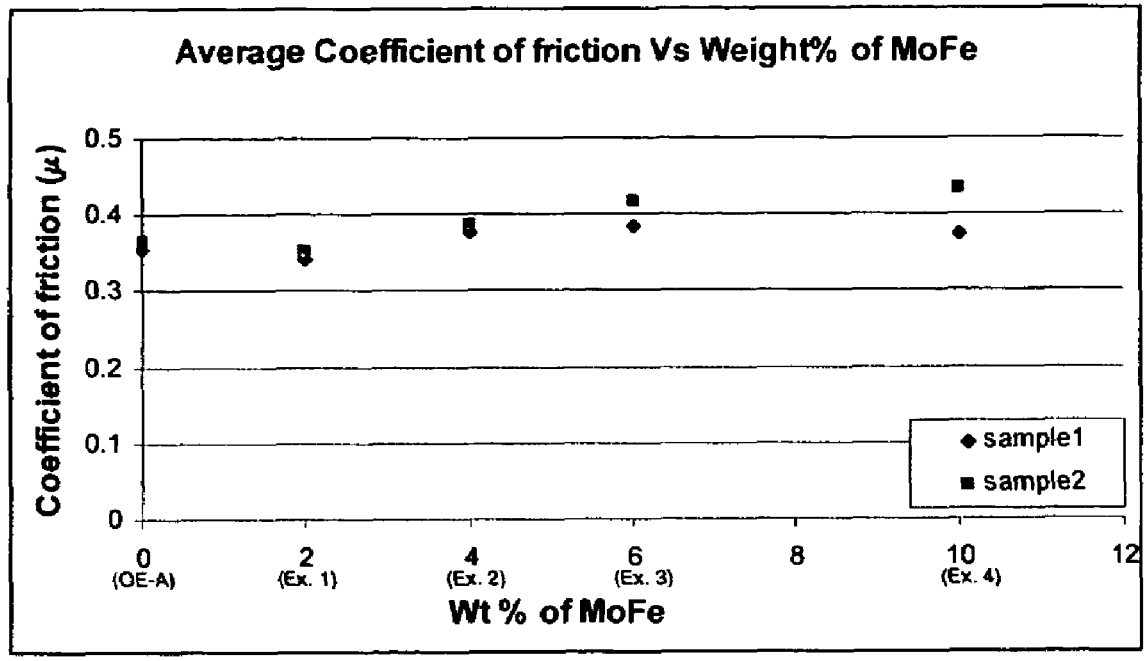
FIG. 2 shows the average coefficients of friction for the OE-A baseline and Examples 1-4, shown as a function of wt. % of Fe—Mo Intermetallic and copper oxide (Blend A).

Average values of the coefficient of friction for the baseline OE-A sample and Examples 1-4 are shown in FIG. 2. The baseline sample appears in FIG. 2 as having 0 wt. % Fe—Mo Intermetallic and copper oxide powders. Although Example 1 exhibited an average coefficient of friction that is slightly lower than that of the baseline sample, average coefficient of friction data for Examples 2-4 demonstrate that the coefficient of friction increased slightly with added Fe—Mo Intermetallic and copper oxide up to about 6 wt. %, then reaching a stabilized value close to 0.4μ.

Figure 3:
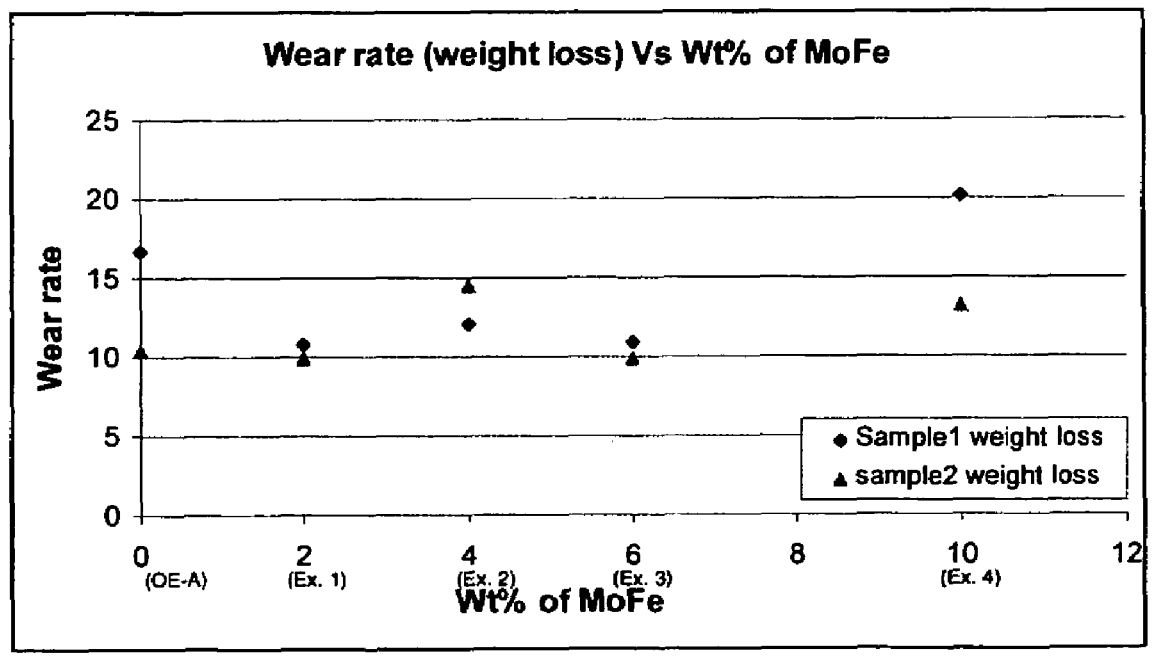
FIG. 3 shows the wear rate measured by average weight loss for the OE-A baseline and Examples 1-4, shown as a function of wt. % of Fe—Mo Intermetallic and copper oxide (Blend A).

Examples 1-4 and the baseline OE-A friction lining were tested for wear following the friction tests. FIG. 3 shows compares average wear data among the samples. When compared to the baseline sample, Examples 1-3 exhibited similar wear. Wear of Example 4 was slightly higher.

Swell and Growth

Swell and growth are measures of the temporary and permanent amount of thickness increase when a substance is heated to 400° F. (204.4° C.). With present test methods, it is understood that swell should be no more than 2.7%. The results for testing the baseline and Examples 1-4 are shown below in Table 2.

TABLE 2

Swell and growth test results.

| Blend A | 1 | 2 | 3 | Average (%) |
|---|---|---|---|---|
| OE-A | 0.9 | 0.85 | 0.72 | 0.82 |
| Ex. 1 | 0.33 | 0.26 | 0.33 | 0.31 |
| Ex. 2 | 0.26 | 0.25 | 0.29 | 0.27 |
| Ex. 3 | 0.22 | 0.23 | 0.29 | 0.25 |
| Ex. 4 | 0.20 | 0.25 | 0.23 | 0.21 |

For all samples, tested swell and growth were far below 2.7%.

Brinell Hardness

Table 3 lists the detected values of Brinell hardness for the baseline sample and Examples 1-4.

TABLE 3

Brinell hardness of investigated samples.

| Blend A | 1 | 2 | 3 | Average |
|---|---|---|---|---|
| OE-A | 28 | 26 | 27 | 27 |
| Ex. 1 | 32 | 28 | 28 | 29 |
| Ex. 2 | 33 | 30 | 31 | 31 |
| Ex. 3 | 31 | 30 | 33 | 31 |
| Ex. 4 | 33 | 32 | 30 | 32 |

Adding Fe—Mo Intermetallic and copper oxide powders increased the hardness of brake linings as shown in Table 3, which may affect compressibility although that was not tested. Density of the tested materials varied from 1.86 to 1.93 g/cm$^3$.

Shear Strength

Shear strength data for the baseline sample and Examples 1-4 are shown in Table 4.

TABLE 4

Shear strength (in MPa) of brake lining samples with different content of ferromolybendum-copper oxide powders in formulation.

| Blend A | 1 | 2 | 3 | average |
|---|---|---|---|---|
| OE-A | 28 | 26 | 27 | 27 |
| Ex. 1 | 32 | 28 | 28 | 29 |
| Ex. 2 | 33 | 30 | 31 | 31 |
| Ex. 3 | 31 | 30 | 33 | 31 |
| Ex. 4 | 33 | 32 | 30 | 32 |

As expected, shear strength of Examples 1-4 increased with increasing amounts of Fe—Mo Intermetallic-copper oxide powders in the friction lining compositions tested.

Thermo Gravimetric Analysis (TGA)

Figure 4:
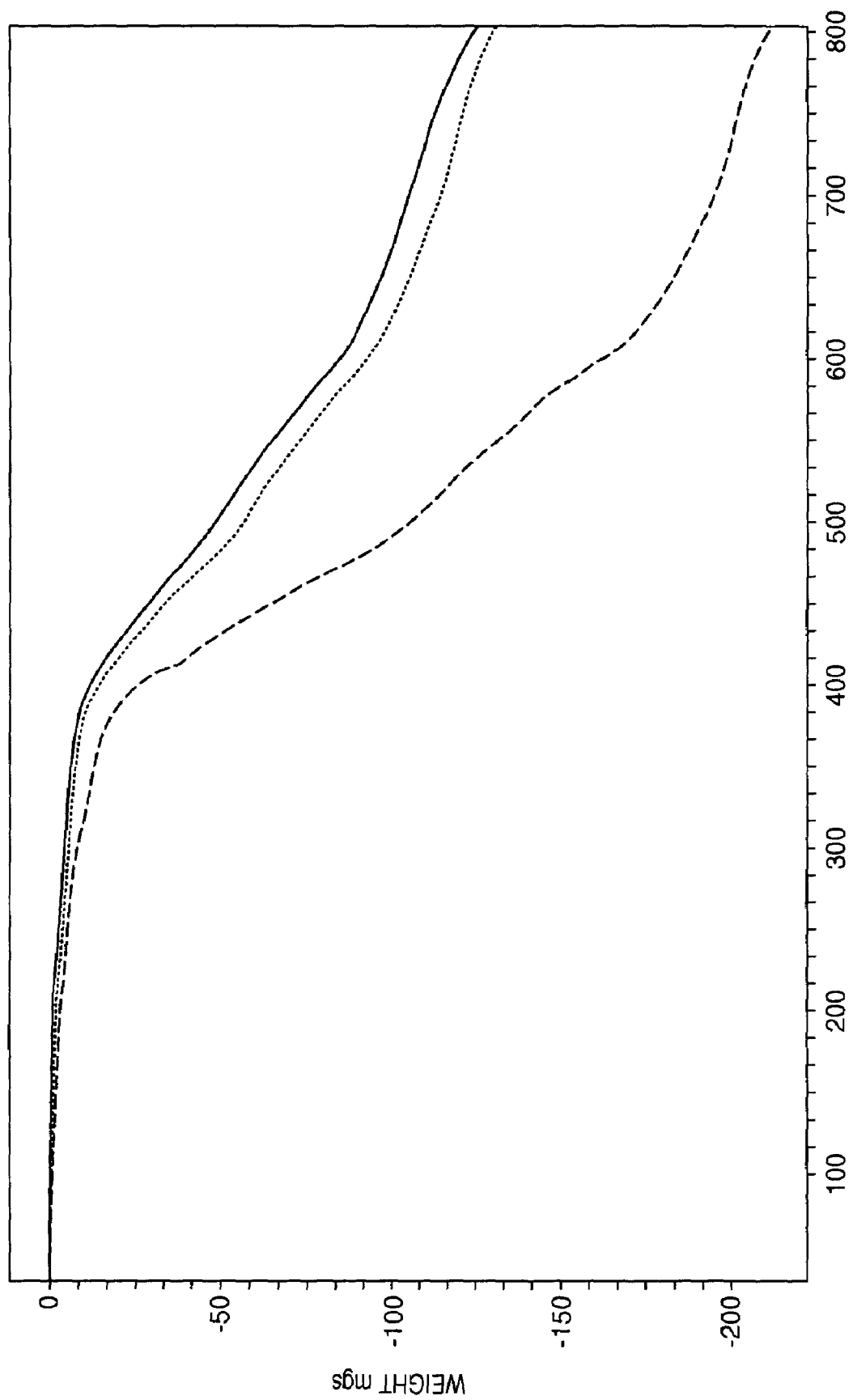
FIG. 4 shows TGA results of the OE-A (bottom curve), Example 2 (middle curve) and Example 4 (top curve).

TGA tests were performed to ascertain the thermal stability of the baseline sample and Examples 2 and 4. The mass of each sample was monitored while the temperature was increased. FIG. 4 shows the thermal stability of the baseline sample and Examples 2 and 4 by plotting weight loss as a function of temperature. As a result of this testing, it is believed that the additions of the Fe—Mo Intermetallic-copper oxide powders of the present invention catalyze the polycondensation reaction of the phenolic resin, resulting in a composite material that becomes more stable with increasing amounts of Fe—Mo Intermetallic and copper oxide. While the baseline sample began to decompose at temperatures up to about 200° C., as shown in FIG. 4, Examples 2 and 4 exhibited water loss only at those temperatures. Although significant weight loss occurred at temperatures above 400° C. for all samples, Examples 2 and 4 decomposed significantly slower that the baseline OE-A friction lining, as evidenced by their smaller weight losses.

Dynamometer Tests

Full-scale dynamometer tests SAE J2430 and AO4D tests were carried out on the baseline OE-A friction lining and Example 2. Example 2 was selected for additional testing because it exhibited the best overall performance based on the test parameters described above. Three tests were performed on the baseline OE-A and eight tests were performed on Example 2 samples. All of the samples were subjected to the J2430 tests for wear.

Figure 5A:
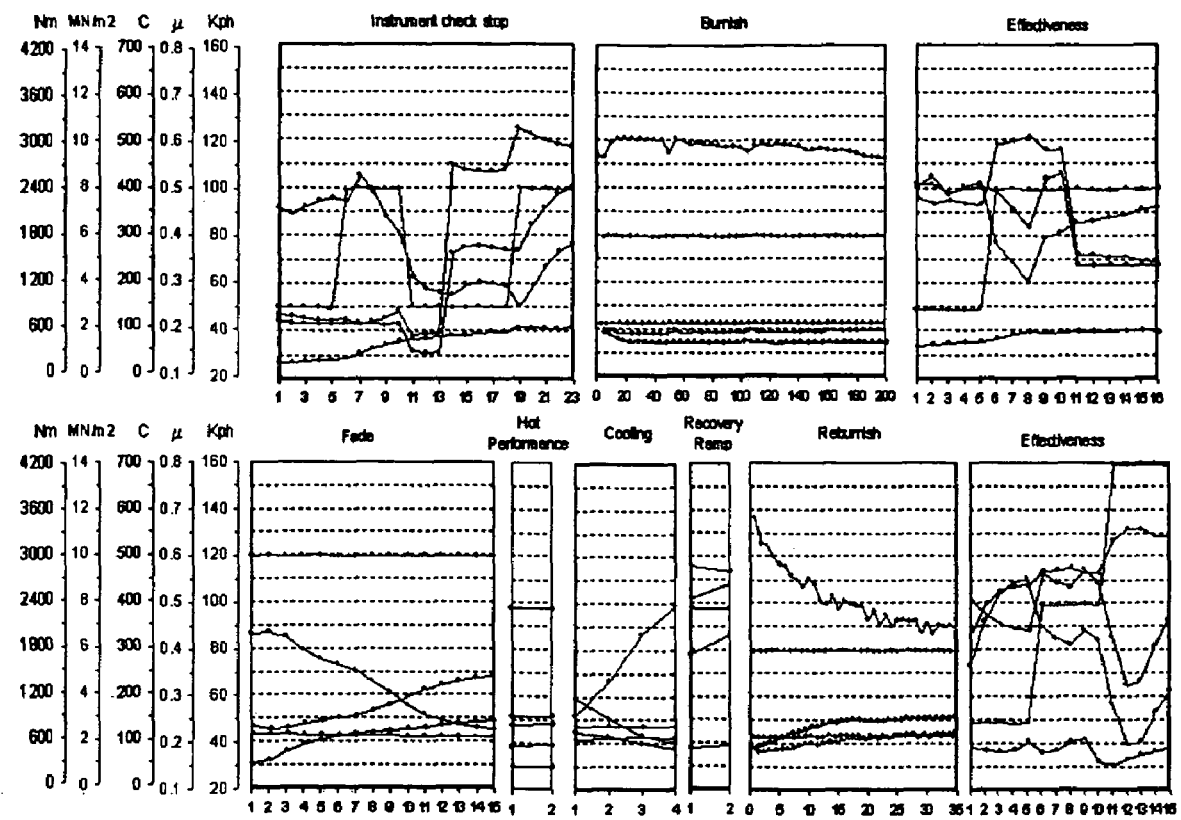
FIG. 5a shows performance data from J2430 testing of the OE-A baseline friction lining.
Figure 5B:
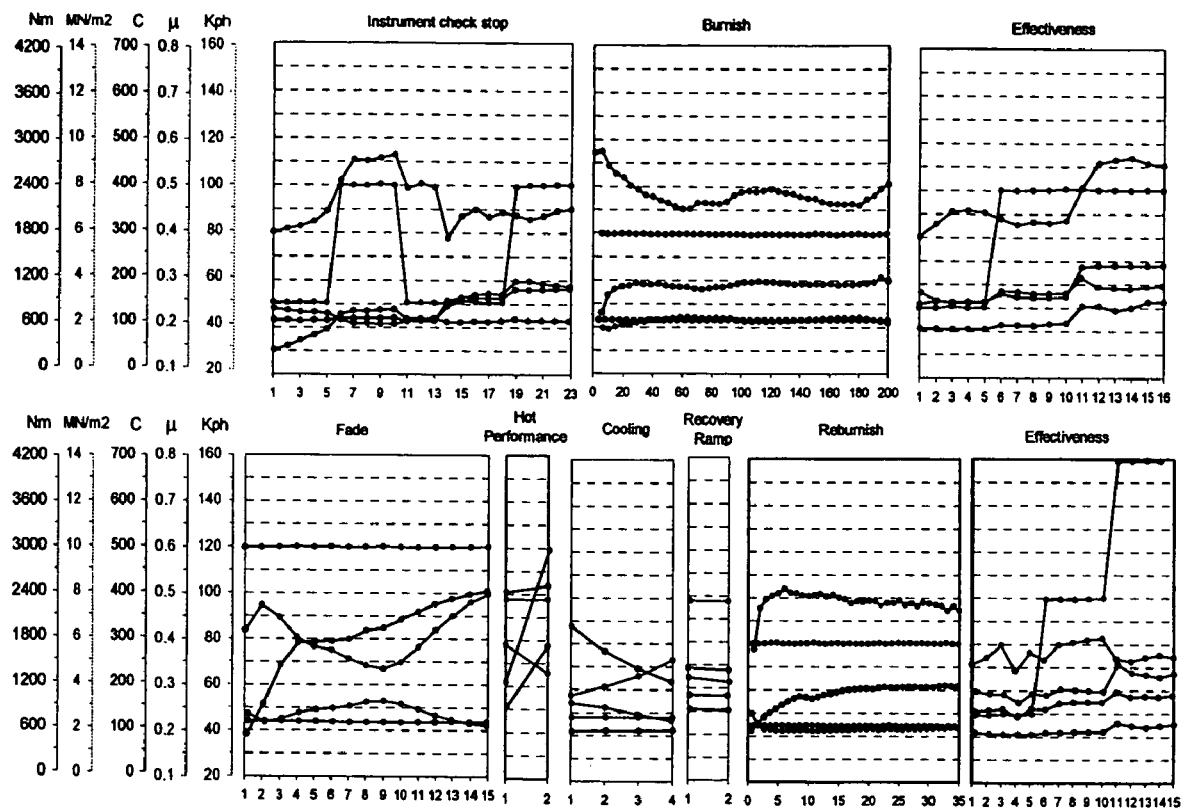
FIG. 5b shows performance data from J2430 testing of Example 2.

FIGS. 5a and 5b show the J2430 performance data for the baseline OE-A sample and Example 2. Example 2 exceeded the braking performance of the baseline sample. Example 2 passed the braking effectiveness evaluation procedure as required by FMVSS 135. The major improvement in Example 2 over the baseline sample was detected in fade snubs. Fade was greatly reduced and braking effectiveness (faster stopping at lower speeds) was improved in Example 2 as compared with the baseline OE-A friction lining.

Figure 6A:
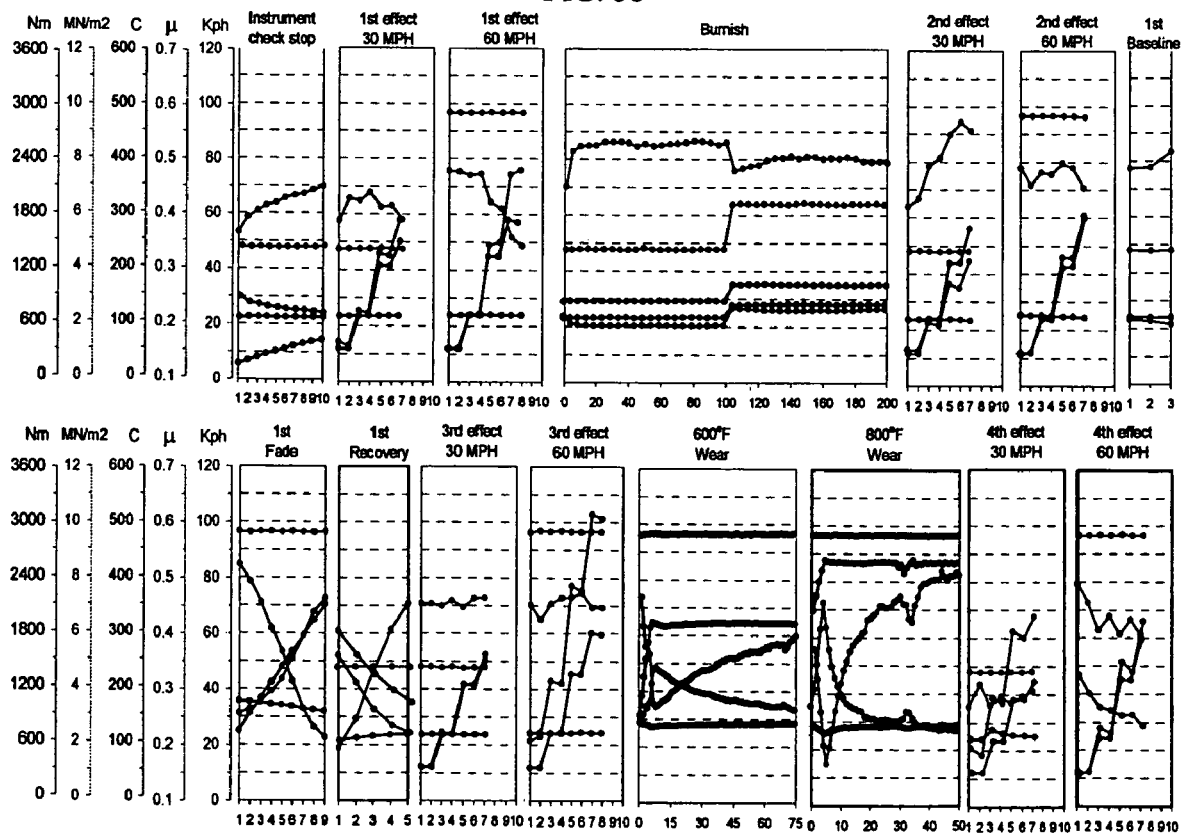
FIG. 6a shows performance data from AO4D testing of OE-A baseline friction lining.
Figure 6B:
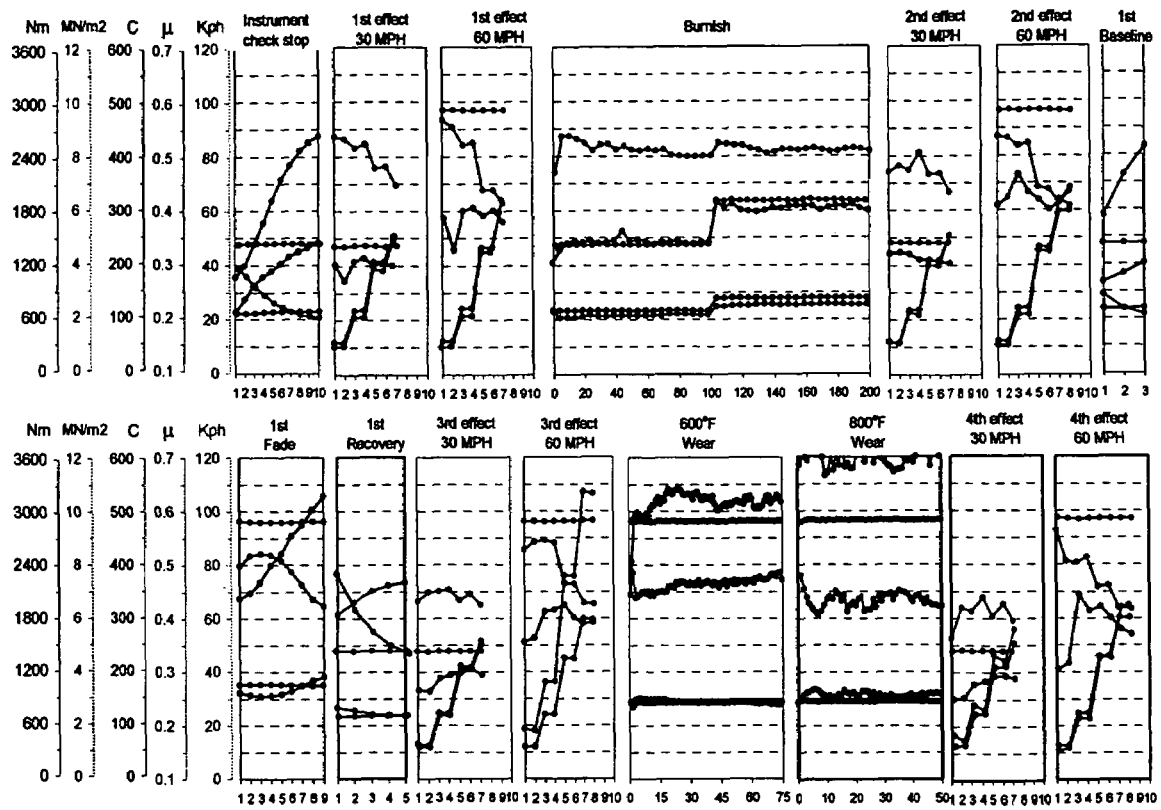
FIG. 6b shows performance data from AO4D testing of Example 2.

FIGS. 6a and 6b show the AO4D performance data for the baseline friction lining sample and Example 2. While Example 2 showed a certain decrease in the coefficient of friction during fade snubs, the baseline OE-A friction linings demonstrated extensive fade during AO4D testing.

Figure 7A:
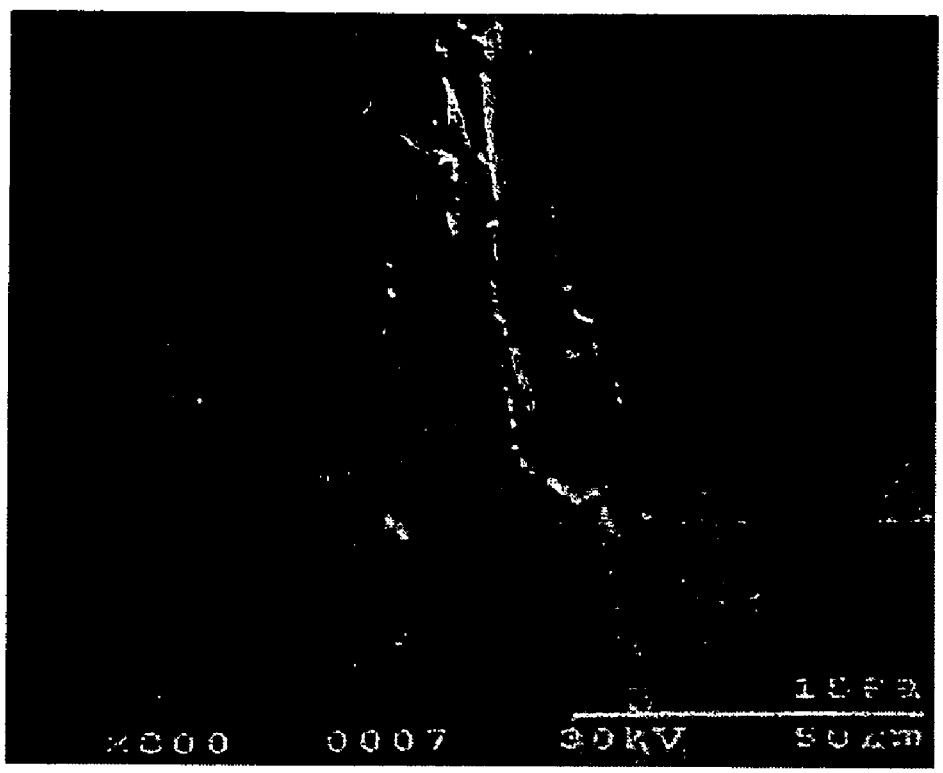
FIG. 7a shows an SEM image of a friction layer of the OE-A baseline after fade snubs.
Figure 7B:
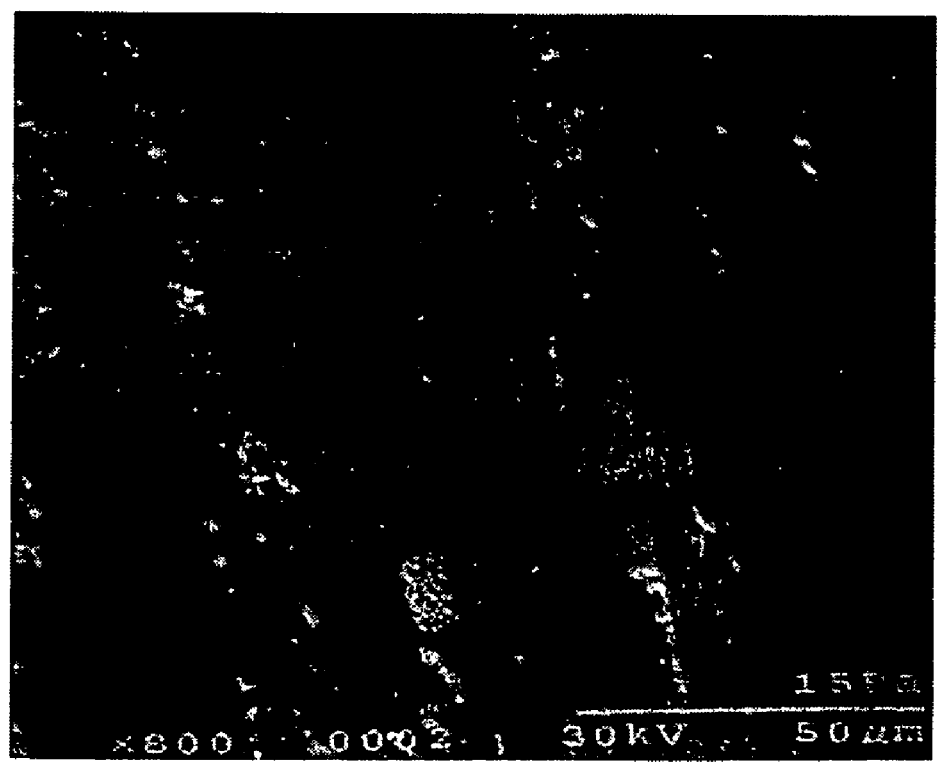
FIG. 7b shows an SEM image of a friction layer of Example 2 after fade snubs.

The baseline OE-A friction lining and Example 2 were subjected to friction surface analysis following fade snubs in the J2430 testing. FIG. 7a is an SEM image of the baseline OE-A friction lining and FIG. 7b is an SEM image of Example 2. EDX analysis as shown in FIG. 7c clearly indicates that, as compared to the baseline OE-A friction lining, Example 2 developed a friction layer with a higher content of molybdenum, copper, iron, tin, antimony and barium. XRD analysis revealed that these elements form a complex mixture of oxides on the friction surface. It is believed that the different oxide content in the friction layers is responsible for the better frictional performance of Example 2 over the baseline OE-A friction lining.

Wear

Wear data for the baseline OE-A friction lining and Example 2 were obtained during the AO4D testing as shown in Table 5.

TABLE 5

Wear rate after AO4D test

| | OE-A | Blend A, Ex. 2 |
|---|---|---|
| Inner pad | | |
| mass (g) before test | 623.61 | 543.35 |
| mass (g) after test | 577.94 | 487.44 |
| difference | 45.67 | 18.64 |
| Wear | 23.29 | 16.09 |
| thickness (mm) before test | 17.26 | 13.82 |
| thickness (mm) after test | 15.09 | 10.69 |
| difference | 2.17 | 1.04 |
| Wear (%) | 19.91 | 13.99 |
| Outer pad | | |
| mass (g) before test | 625.79 | 540.03 |
| mass (g) after test | 603.46 | 493.04 |
| difference | 22.33 | 15.66 |
| Wear (%) | 11.62 | 13.93 |

TABLE 5-continued

Wear rate after AO4D test

| | OE-A | Blend A, Ex. 2 |
|---|---|---|
| thickness (mm) before test | 17.26 | 13.42 |
| thickness (mm) after test | 16.15 | 11.30 |
| difference | 1.11 | 0.71 |
| Wear (%) | 10.18 | 10.01 |

Average weight losses for the baseline OE-A friction lining (17.27%) exceeded those for Example 2 (15.01%). Thickness changes due to wear were also lower in Example 2 (12.00%) when compared to the baseline OE-A friction lining (15.05%).

All of the Examples and the baseline OE-A friction lining sample were subjected to wear testing after the J2430 testing, as shown in Table 6.

TABLE 6

Wear as detected after J2430 SAE procedure.

| | Wear (wt. %) | | | |
|---|---|---|---|---|
| Blend A | 1 | 2 | 3 | Average |
| OE-A | 12.3 | 11.9 | 14.2 | 12.8 |
| Ex. 1 | 8.55 | 7.16 | 7.85 | 7.85 |
| Ex. 2 | 4.9 | 5.25 | 6.2 | 5.45 |
| Ex. 3 | 5.2 | 3.9 | 4.5 | 4.53 |
| Ex. 4 | 4.3 | 4.8 | 4.95 | 4.68 |

As the data demonstrate, wear rates decrease when increasing amounts of Fe—Mo Intermetallic-copper oxide powders are added to a friction lining composition. Examples 3 and 4 can be considered the same in terms of wear.

Noise

Example 2 and the OE-A friction lining were tested for noise using the J2521 noise test that is well known to those of skill in the art. Noise is defined as a pressure level of 70 dB or higher. Since both Example 2 and the baseline OE-A sample exhibited pressure levels of around 20 dB, they are not considered to emit noise.

EXAMPLES 5-8

In Examples 5-6, a second original equipment brake friction lining, OE-B, was modified by replacing varying amounts of the carbonaceous components with Fe—Mo Intermetallic and copper oxide additives according to the present invention. In Examples 7-8, the OE-B friction lining was modified by replacing varying amounts of the carbonaceous components with a Fe—Mo Intermetallic, copper oxide and calcium carbonate powder additive according to the present invention. Testing on Examples 5-8 was done to evaluate their performance generally and in brake testing conducted under simulated winter driving conditions of low temperature, high humidity and salty environment. Friction lining performance tests (e.g., FAST J2430, wear tests) were performed in the manner previously described herein. Characterization analyses (e.g., LM, XRD, SEM, EDX) performed on the baseline samples and Examples 5-8 are also as previously described.

In the winter, brakes are often used in an environment containing chlorine ions that are a product of the magnesium chloride and sodium chloride used to treat roads for snow and ice. Under those conditions, combined with high humidity (50% relative humidity and above) and low temperatures (around 0° C. and below), friction linings may exhibit a sudden and significant decrease in the coefficient of friction. As shown in FIG. 8a, for example, under normal test conditions, the OE-B friction lining caused a vehicle to come to a stop from 50 km/hr in 1.0 seconds. However, in winter-type driving conditions, braking is significantly impaired. The OE-B friction lining was tested at 6° C., 87% relative humidity, after application of $MgCl_2$ spray. As demonstrated by FIG. 8b, the wheel speed actually increased after applied braking in the first 6 seconds. More importantly, the time necessary to stop the vehicle increased to almost 11 seconds. It is believed that the carbonaceous material in the OE-B brake lining was prone to the absorption and intercalation of moisture of $Mg^{2+}$, $Cl^-$ and $Na^+$ ions.

The OE-B friction lining was analyzed to identify the constituents present and their quantities. This analysis was performed in the same manner as that described above with respect to the OE-B friction lining. The formulation of the OE-B friction lining is set forth in table 7.

TABLE 7

Formulation of OE-B friction lining

| Constituent | Content (wt. %) |
|---|---|
| coke | 14.83 |
| graphite | 4.29 |
| kevlar | 3.28 |
| copper | 13.99 |
| steel | 15.35 |
| brass | 10.18 |
| $Sb_2S_3$ | 7.24 |
| vermiculite | 4.68 |
| chrome | 3.36 |
| $TiO_2$ | 1.52 |
| MgO | 2.73 |
| $SiO_2$ | 0.91 |
| Carbon black | 3.98 |
| Acrylic fiber | 3.82 |
| Phenolic resin | 9.83 |
| porosity | 0.00 |

This OE-B friction lining was replicated in the laboratory to produce a laboratory material friction lining (LM). Both OE-B and LM friction linings were used as baselines for testing of Examples 5-8. The total amount of carbonaceous material (graphite and coke) comprised about 20 wt. % (e.g., 19.12 wt. %). In Example 5, about 10% of the carbonaceous material was replaced by Fe—Mo Intermetallic-copper oxide powders of the present invention, meaning that Fe—Mo Intermetallic-copper oxide powders comprised about 2 wt. % (e.g., 1.912 wt. %). The Fe—Mo Intermetallic-copper oxide additive comprised about 95 wt. % Fe—Mo Intermetallic and about 5 wt. % copper oxide. In Example 6, about 50% of the carbonaceous material was replaced by Fe—Mo Intermetallic-copper oxide additives of the present invention, meaning that Fe—Mo Intermetallic-copper oxide additives comprised about 10 wt. % (e.g., 9.56 wt. %). The Fe—Mo Intermetallic-copper oxide additives comprised about 95 wt. % Fe—Mo Intermetallic and about 5 wt. % copper oxide. The additive comprised Fe—Mo Intermetallic and copper oxide powders having particle sizes in the range of about 2 µm to 200 µm. In Example 7, about 10% of the carbonaceous material was replaced by Fe—Mo Intermetallic, copper oxide, and calcium carbonate additives of the present invention, meaning that Fe—Mo Intermetallic-copper oxide-calcium carbonate powders comprised about 2 wt. % (e.g., 1.912 wt. %). The Fe—Mo Intermetallic-copper oxide-calcium carbonate additives comprised about 93 wt. % Fe—Mo Intermetallic, about 5 wt. % copper oxide, and about 2 wt. % calcium carbonate. The additive comprised Fe—Mo Intermetallic, copper oxide and calcium carbonate powders having particle sizes in the range of about 2 µm to 200 µm. In Example 8, about 50% of the carbonaceous material was replaced by Fe—Mo Intermetallic, copper oxide and calcium carbonate additives, meaning that Fe—Mo Intermetallic-copper oxide-calcium carbonate additives comprised about 10 wt. % (e.g., 9.56 wt. %). The Fe—Mo Intermetallic-copper oxide-calcium carbonate additives comprised about 93 wt. % Fe—Mo Intermetallic, about 5 wt. % copper oxide, and about 2 wt. % calcium carbonate. The additive comprised Fe—Mo Intermetallic, copper oxide and calcium carbonate powders having particle sizes in the range of about 2 µm to 200 µm.

The OE-B friction lining, the LM friction lining and Examples 5-8 were subjected to a variety of brake performance tests, as described above, that are well known in the art. Then, they were subjected to full-scale dynamometer testing under conditions to simulate winter driving. The OE-B and LM samples were used as baseline materials. Seven LM samples were formulated; six samples were used for full-scale dynamometer J2430 testing and one sample was used for FAST tests. The J2430 testing was later repeated. Due to loss of thermocouple contact during the first set of tests, temperatures were not always measured properly; therefore, the J2430 test data set forth herein come from the second set of tests.

Fast

Figure 9A:
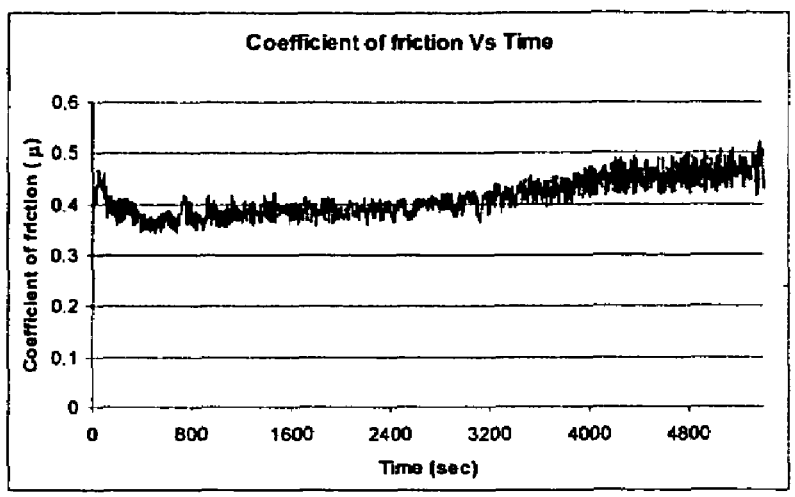
FIG. 9a shows the coefficient of friction as a function of time for the OE-B baseline sample.
Figure 9B:
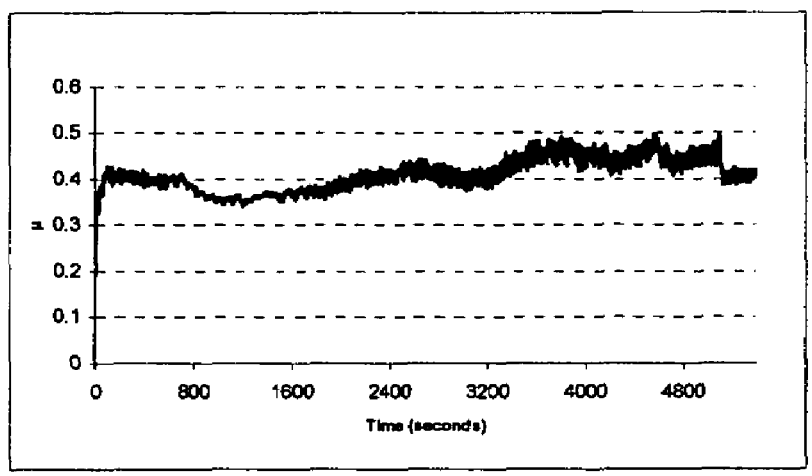
FIG. 9b shows the coefficient of friction as a function of time for the LM baseline sample.

OE-B and LM samples and Examples 5-8 were subjected to FAST testing. FIG. 9a shows the coefficient of friction as a function of time for the OE-B sample; FIG. 9b shows the coefficient of friction as a function of time for the LM sample. OE-B and LM materials behaved similarly. The average coefficient of friction was 0.41µ for the OE-B material and 0.40µ for the LM material.

Figure 9C:
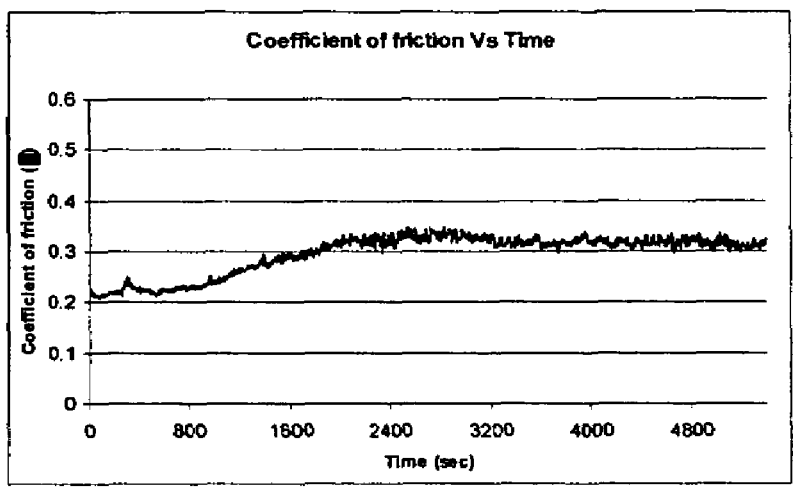
FIG. 9c shows the coefficient of friction as a function of time for Example 5.
Figure 9D:
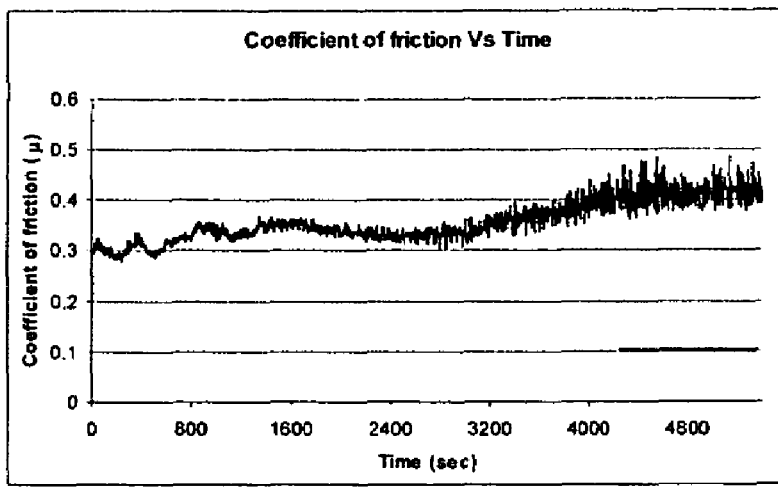
FIG. 9d shows the coefficient of friction as a function of time for Example 6.

Coefficient of friction results from FAST testing of Examples 5 and 6 are shown in FIGS. 9c and d. While the coefficients of friction for Examples 5 and 6 were slightly lower than those of the OE-B and LM baseline samples, SEM testing revealed that Examples 5 and 6 develop a stable friction layer during testing. As a consequence, the coefficient of friction increased and stabilized during the final phase of FAST testing. Example 6 exhibited a higher coefficient of friction than Example 5. The coefficient of friction for Example 5 was low at the outset, but was otherwise quite efficient during the first 1000 seconds of FAST testing.

Figure 9E:
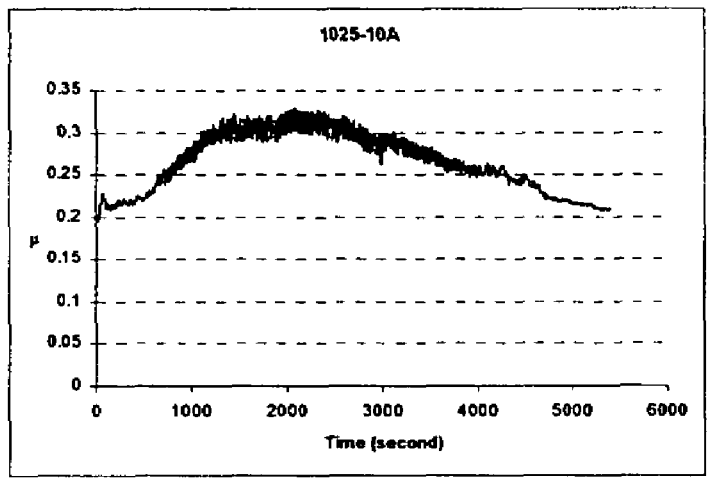
FIG. 9e shows the coefficient of friction as a function of time for Example 7.
Figure 9F:
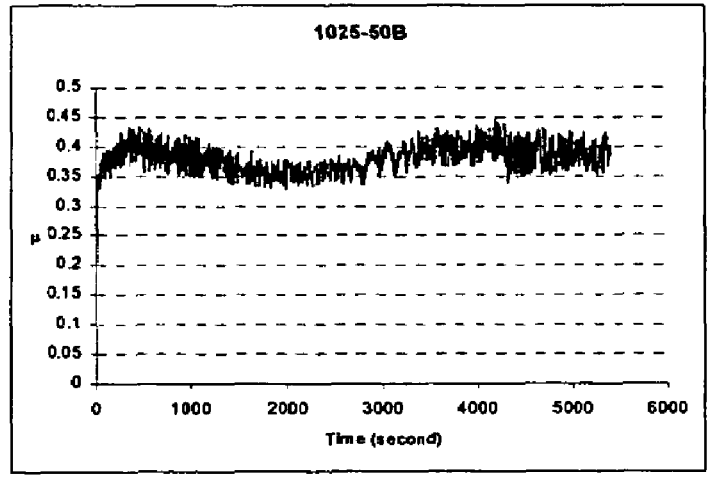
FIG. 9f shows the coefficient of friction as a function of time for Example 8.
Figure 10A:
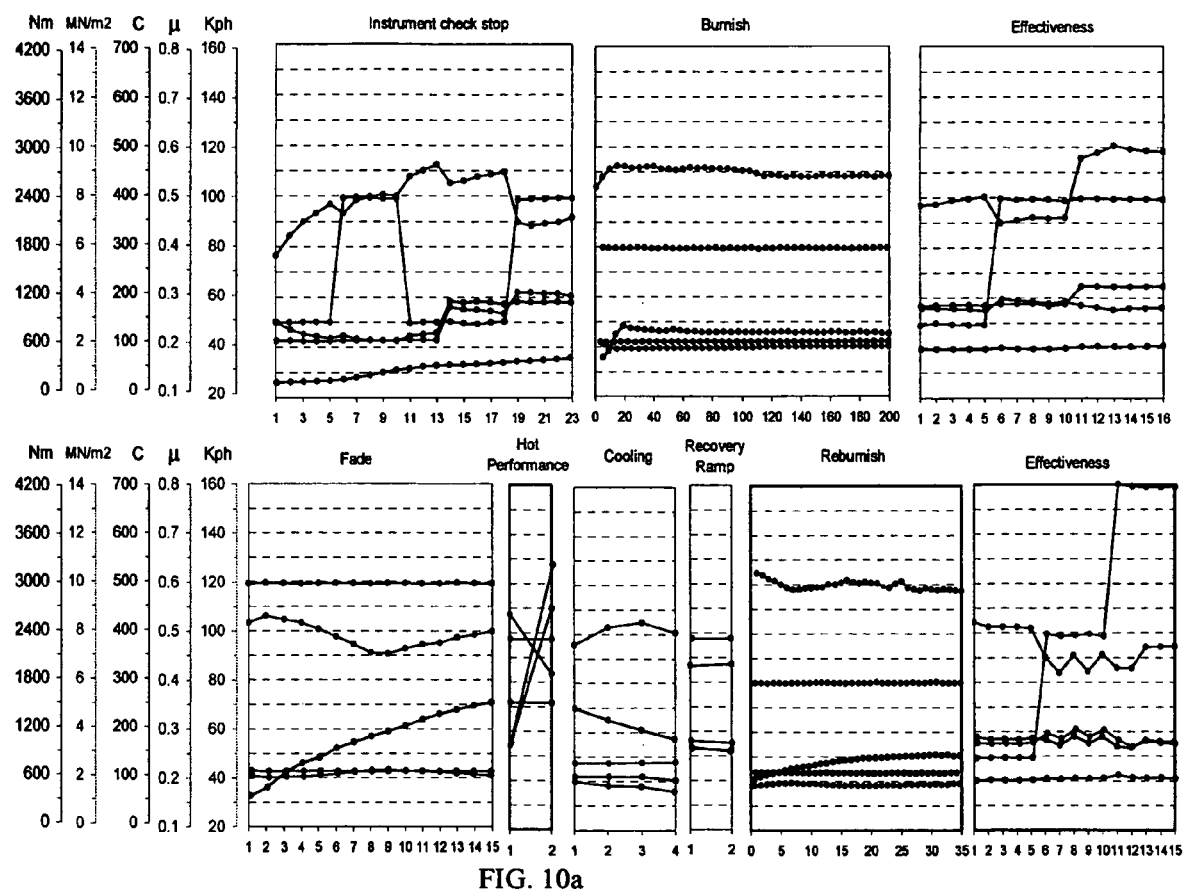
FIG. 10a shows performance data from J2430 testing of the OE-B baseline friction lining.
Figure 10B:
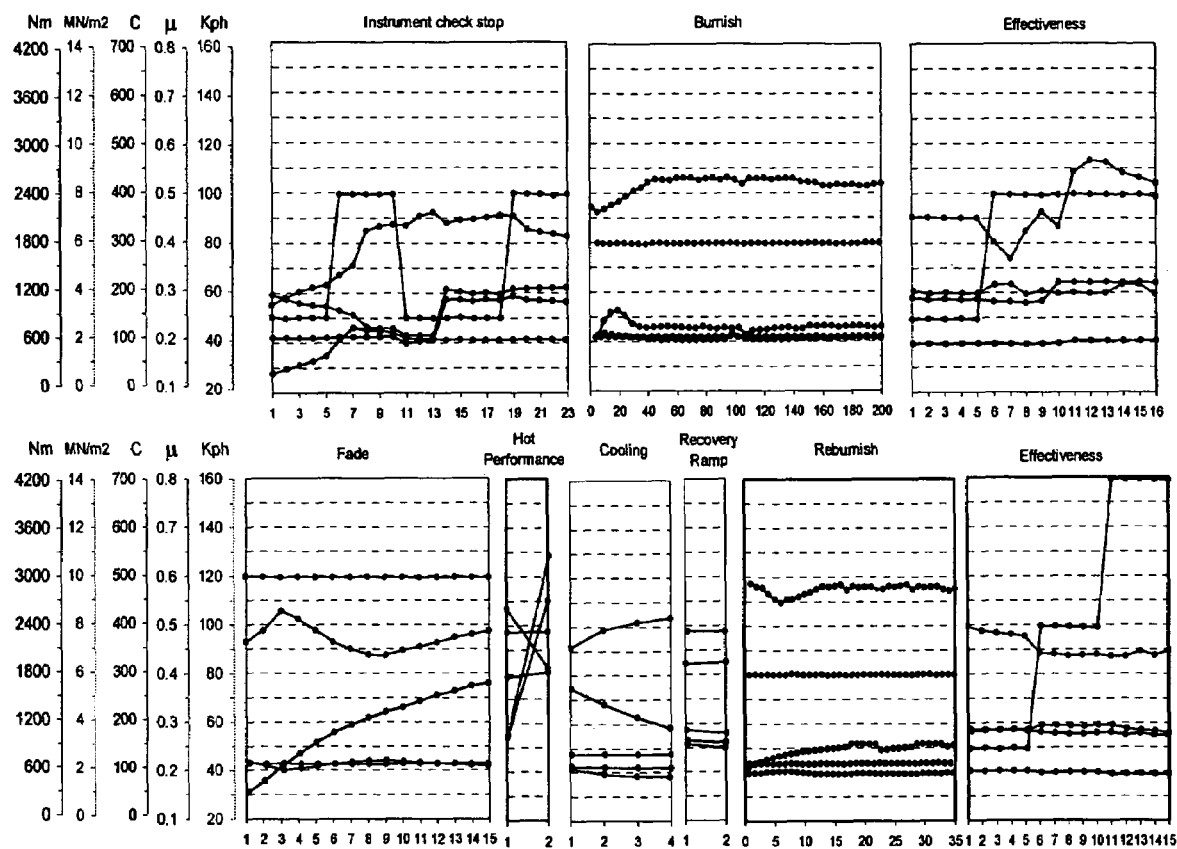
FIG. 10b shows performance data from J2430 testing of the LM baseline friction lining.
Figure 10C:
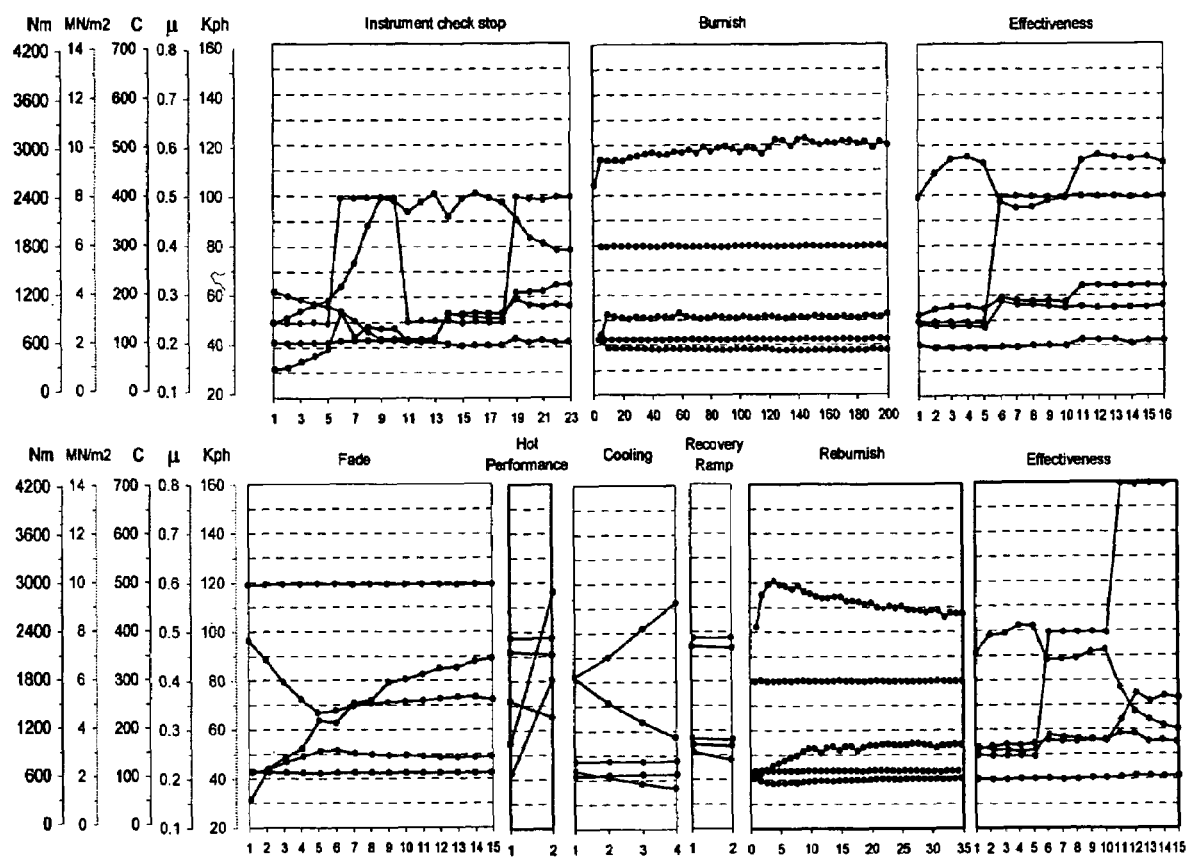
FIG. 10c shows performance data from J2430 testing of Example 5.
Figure 10D:
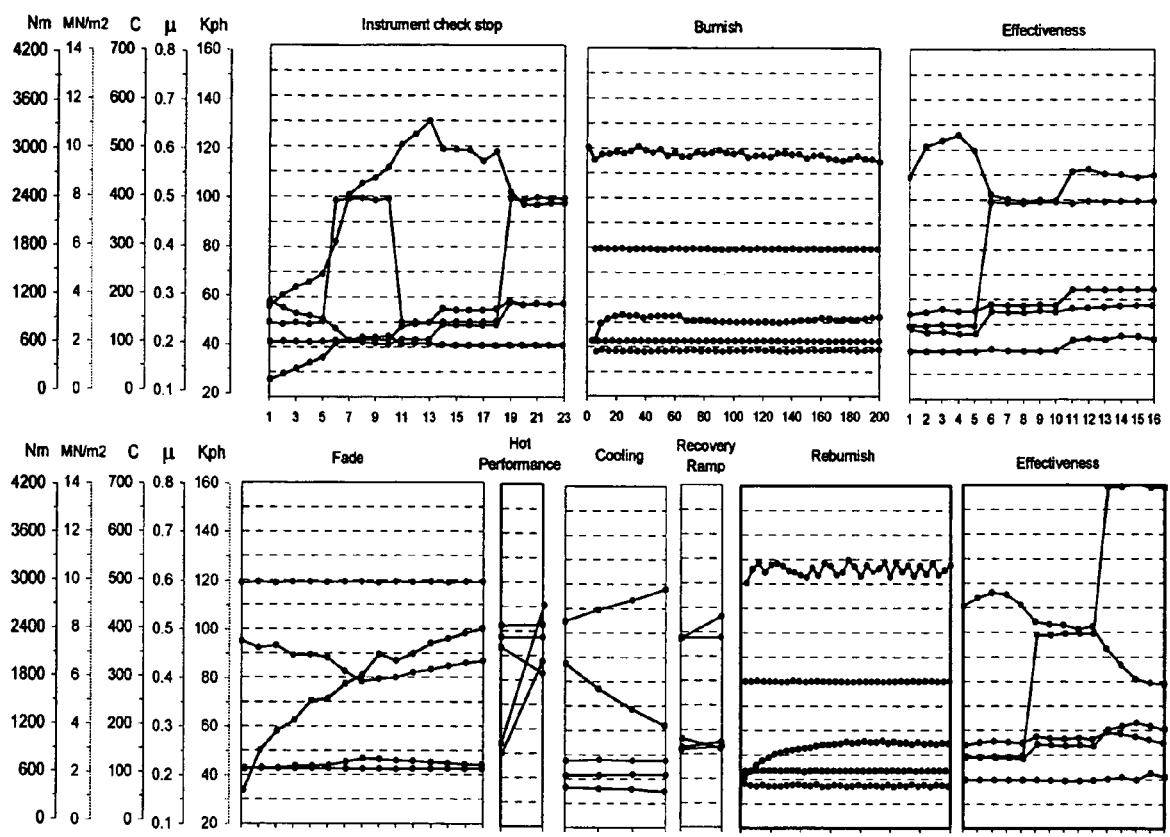
FIG. 10d shows performance data from J2430 testing of Example 6.
Figure 10E:
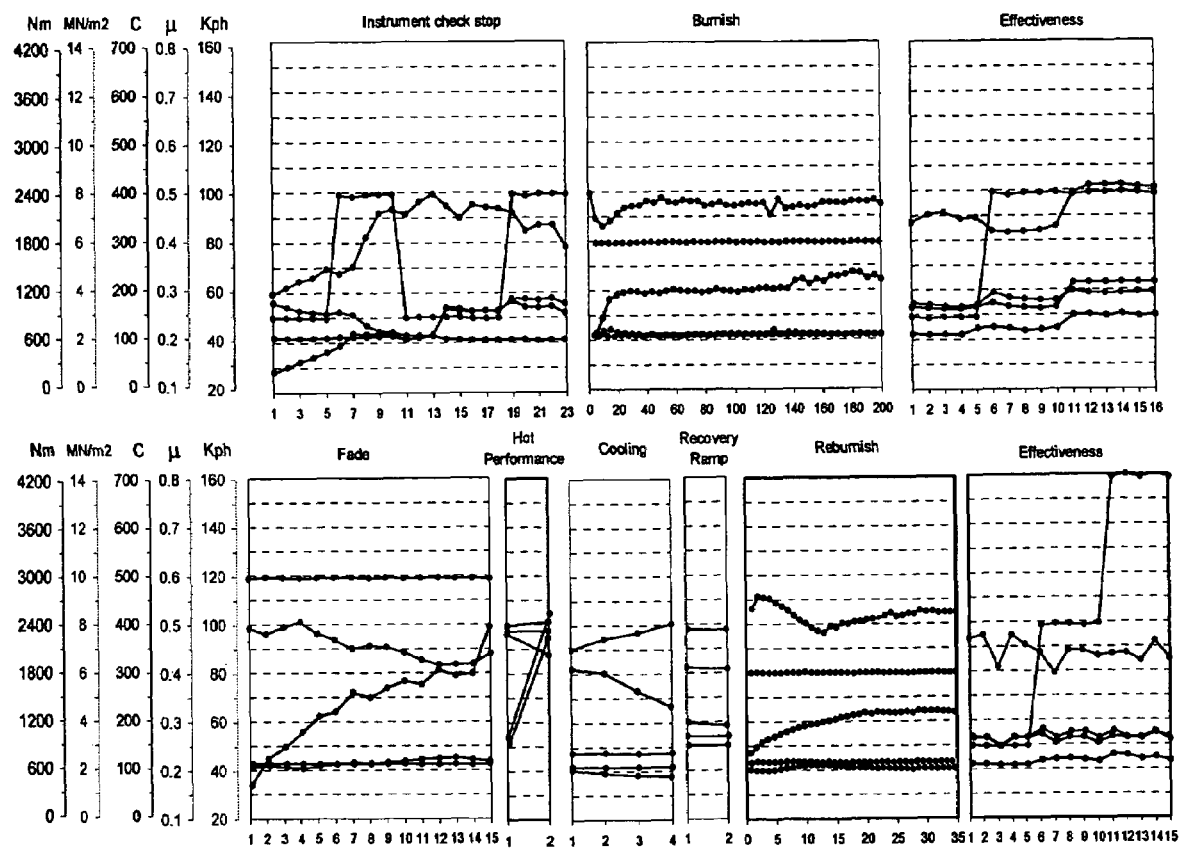
FIG. 10e shows performance data from J2430 testing of Example 7.
Figure 10F:
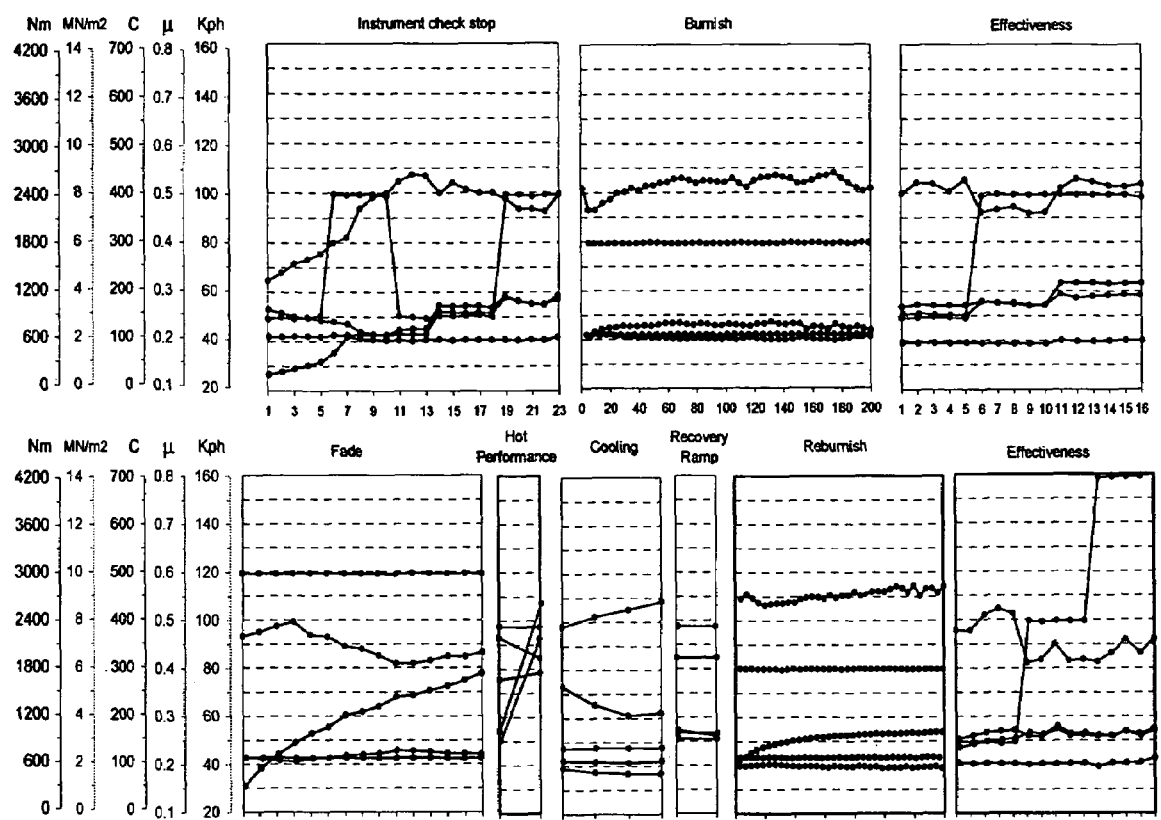
FIG. 10f shows performance data from J2430 testing of Example 8.

The coefficients of friction as a function of time for Examples 7 and 8 are shown in FIGS. 9e and f. Example 7 exhibited a sudden increase in the coefficient of friction after about 1000 seconds of braking. It is believed that this phenomenon resulted from the quick development of a friction layer with adhesive properties. However, this friction layer was not as stable as the layer developed by Example 5; therefore, the coefficient of friction of Example 7 decreased in the second part of FAST testing. As seen in FIG. 9f, Example 8 exhibited a higher, more stable coefficient of friction, as compared to Example 7. As indicated in Table 8 below, the frictional performance of Example 8 when subjected to FAST testing under these test conditions most closely resembles the frictional performance of the baseline OE-B and LM samples.

TABLE 8

Average coefficient of friction and wear as detected in FAST testing for baseline materials (OE-B and LM) and Examples 5-8

| Sample | Average μ | Average wear [wt. %] |
|---|---|---|
| OE-B | 0.41 | 12.45 |
| LM | 0.40 | 12.11 |
| Ex. 5 | 0.30 | 17.62 |
| Ex. 6 | 0.36 | 15.30 |
| Ex. 7 | 0.27 | 12.7 |
| Ex. 8 | 0.38 | 10.3 |

Table 8 also contains average wear data following FAST testing. The wear of Examples 7 and 8 is comparable to the baseline OE-B and LM materials. Wear for Examples 5 and 6 is slightly higher.

Dynamometer Tests

The SAE recommended J2430 test procedure was used to test the baseline OE-B and LM samples, as well as Examples 5-8. The procedure consisted of 23 instrument check stops followed by 200 burnish stops, 16 effectiveness stops, 15 fade stops, 2 hot performance stops, 4 recovery stops, 2 recovery ramp stops, 35 reburnish stops and 15 final effectiveness stops. Speed, pressure and temperature were varied in different procedures. The test results are shown in FIGS. 10a-f.

Examples 5 and 6 exhibited relatively higher sensitivity to speed compared to the baseline OE-B and LM materials. Therefore, for Examples 5 and 6, the changes in coefficient of friction due to speed changes were larger than those for the baseline OE-B and LM materials during the instrument check and the first and second effectiveness tests. Nonetheless, Examples 5 and 6 exhibited both better fade properties and improved recovery properties as compared to the baseline LM material. These data are in good accord with the data from Examples 1-4.

Examples 7 and 8, on the other hand exhibited absence of sensitivity to speed changes during effectiveness testing. As in the case of Examples 5 and 6, Examples 7 and 8 exhibited better fade characteristics that the baseline LM materials. Comparing Examples 7 and 8, the coefficient of friction in Example 8 is always higher. SEM analysis revealed that the increased amount of Fe—Mo Intermetallic, copper oxide and calcium carbonate additives led to the formation of a better developed friction layer with adhesive characteristics.

All samples were subjected to wear tests following the J2430 testing. These data are shown in Table 9.

TABLE 9

Total wear calculated as mass loss in samples subjected to J2430 automotive brake dynamometer testing.

| Sample | Total wear of brake linings [wt %] | Rotor wear [thickness reduction %] |
|---|---|---|
| OE-B | 8.4 | 0.118 |
| LM | 8.67 | 0.121 |
| Ex. 5 | 3.49 | 0.078 |
| Ex. 6 | 3.75 | 0.191 |
| Ex. 7 | 2.42 | 0.117 |
| Ex. 8 | 2.44 | 0.119 |

Figure 11:
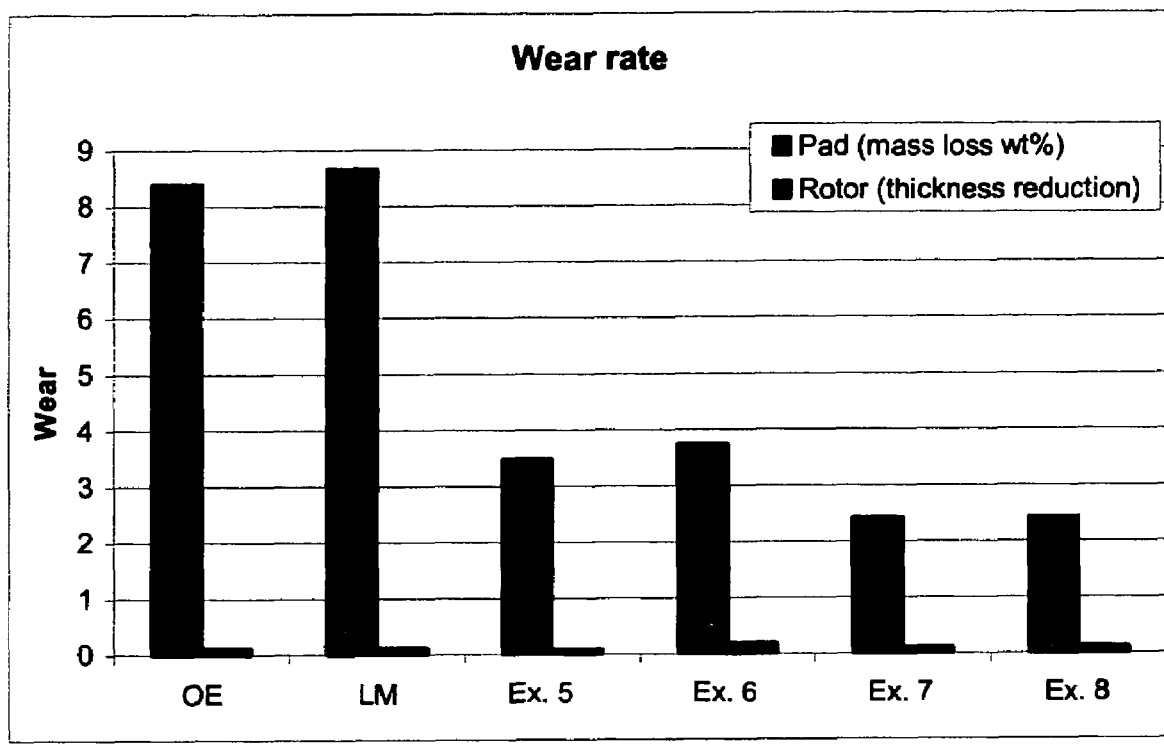
FIG. 11 shows wear data expressed as mass loss in wt. % for friction linings and thickness loss (% reduction for rotors) for OE-B and LM baseline samples and Examples 5-8.

FIG. 11 expresses the data from Table 9 in bar graph form. Wear data from Table 9 and FIG. 11 demonstrate that the addition of Fe—Mo Intermetallic, copper oxide and calcium carbonate additives in Examples 7 and 8 significantly reduces wear of friction linings. Friction lining wear was also reduced in Examples 5 and 6 as compared to the baseline OE-B and LM samples. Rotor wear was comparable for all samples tested. Thus, the addition of Fe—Mo Intermetallic and copper oxide powders, and Fe—Mo Intermetallic, copper oxide and calcium carbonate powders did not lead to an increase in rotor wear.

Modified Dynamometer Testing

Figure 12:
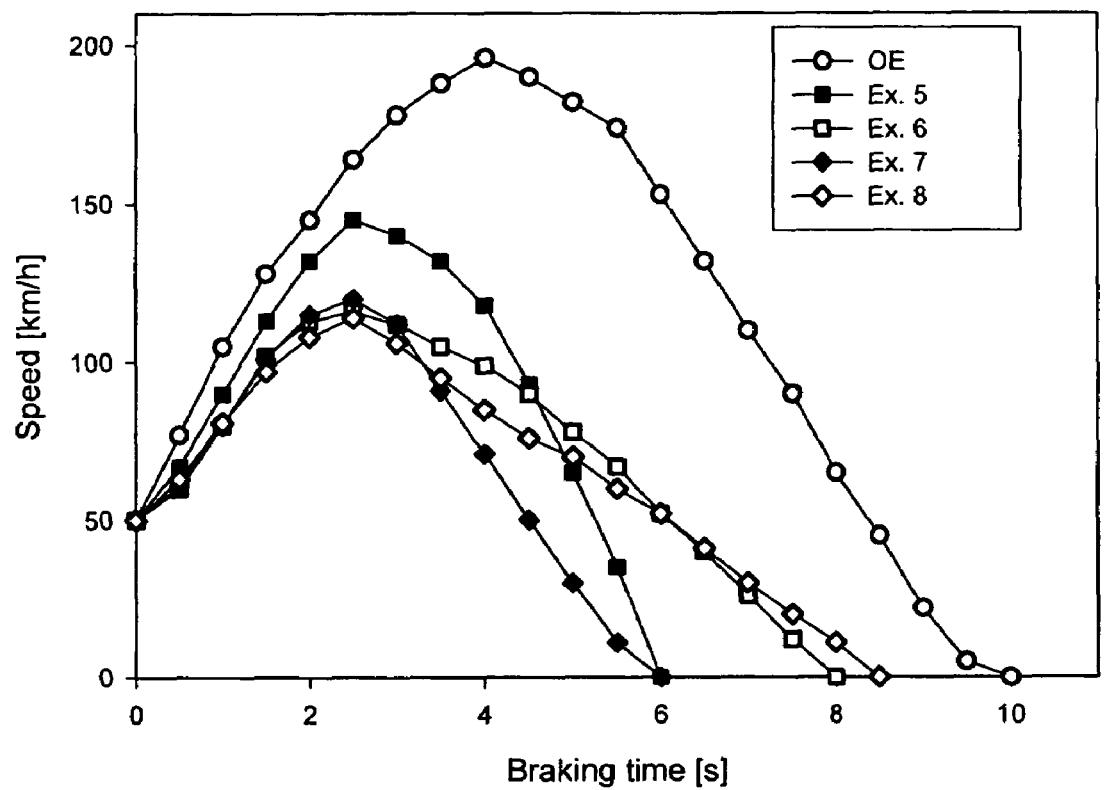
FIG. 12 compares the evolution in speed during braking between the OE-B and LM baseline samples and Examples 5-8 at 6° C., 87% relative humidity and when $MgCl_2$ was applied to the disc.

Dynamometer tests were performed on the OE-B baseline brake material as well as Examples 5-8 to simulate winter driving conditions. The tests were conducted at 0° C. and 87% relative humidity; the friction lining samples were sprayed with a salt solution. FIG. 12 demonstrates the difference in observed braking efficiency. FIG. 12 shows the time dependency of speed (km/h) when braking is applied to a wheel driven with the same energy.

The data in FIG. 12 were generated by applying braking pressure of 5 bar at 50 km/h. When this speed was achieved, the torque was increased to the maximum capacity of the tester (75 Nm). As is readily observed in FIG. 12, the wheel speed initially increased until reaching a maximum speed and then decreased. Eventually, the wheel stopped. Examples 5-8 all demonstrated significant increased braking effectiveness over the baseline OE-B sample under these conditions. The baseline OE-B friction lining reached a maximum speed of almost 200 km/h, with a 10-second stopping time. In contrast, Example 7 exhibited a maximum speed of about 130 km/h, with a stopping time of 6 seconds.

Figure 13A:
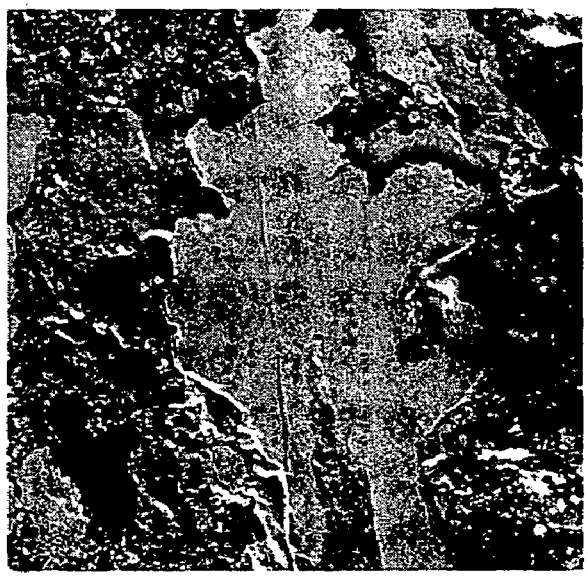
FIG. 13a shows a back-scattered image of the friction surface of OE-B friction lining after J2430 testing.
Figure 13B:
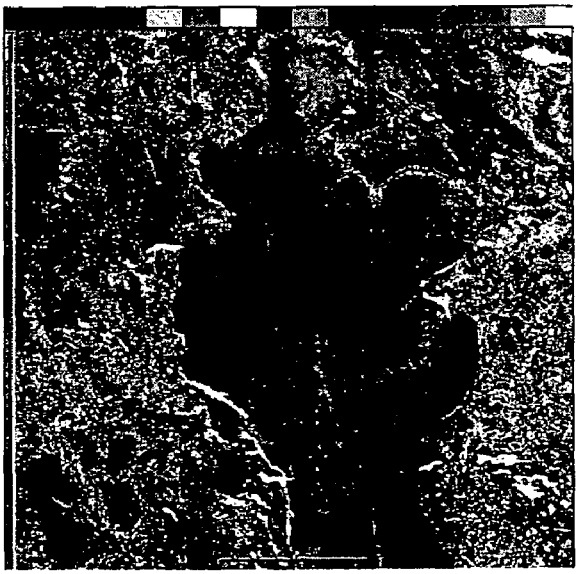
FIG. 13b shows a topographic image of the friction surface of OE-B friction lining after J2430 testing. The friction occurs on elevated areas shown in dark gray.

Again, these differences in performance are believed to result from the development of a friction layer when either Fe—Mo Intermetallic-copper oxide additives or Fe—Mo Intermetallic-copper oxide-calcium carbonate additives are added to the friction linings in place of carbonaceous material. As shown by SEM analysis, the substitution of these powders for carbonaceous material according to the present invention creates on the friction surface a friction layer containing the elements of iron, molybdenum and copper. For example, FIG. 13 represents an SEM image of the OE-B sample subjected to the friction test at 0° C., 87% relative humidity in a salty environment. The topographic image shows that the friction occurs on several areas represented by heavily deformed metallic chips covered by a friction layer. Chemical analysis of the friction layer reveals the presence of significant amounts of copper and antimony, as shown in FIG. 14. Traces of other elements were also detected. A significant amount of carbon is also evident in the friction layers of the baseline OE-B sample.

Figure 16A:
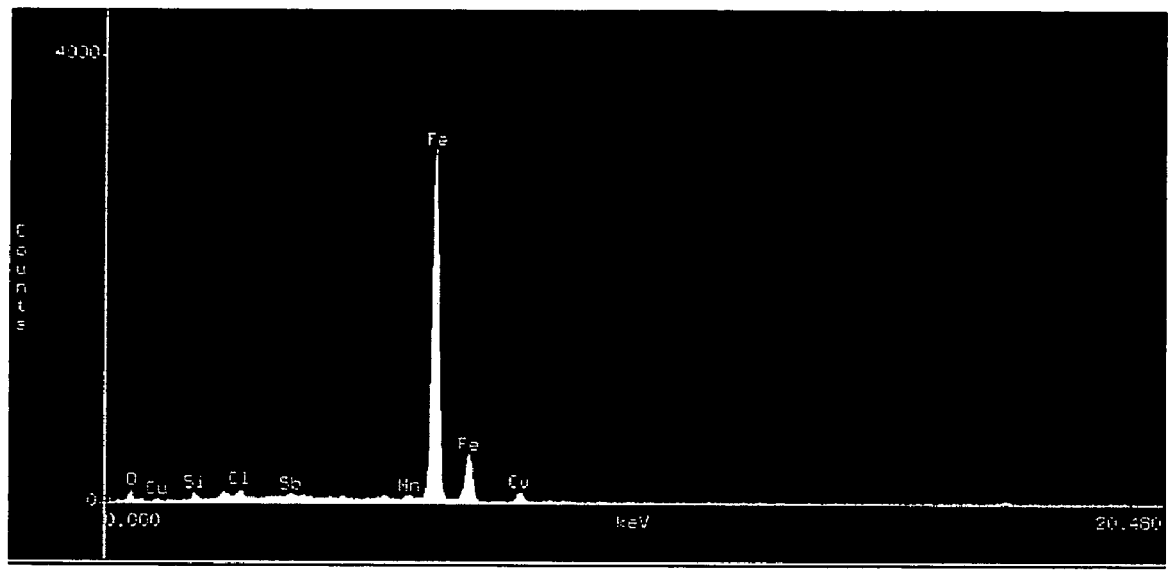
FIG. 16a shows the chemical composition of a friction layer of Example 6 after friction testing at 6° C., 87% relative humidity and when $MgCl_2$ was applied to the disc.
Figure 16B:
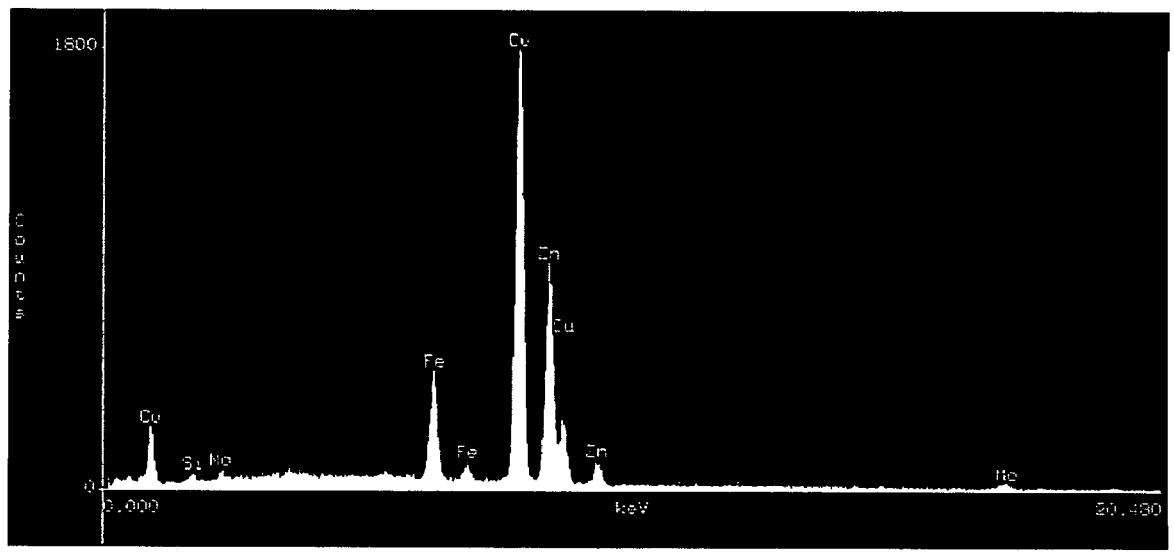
FIG. 16b shows the chemical composition of a friction layer of Example 8 after friction testing at 6° C., 87% relative humidity and when $MgCl_2$ was applied to the disc.

EDX spectra of Examples 6 and 8, as seen in FIGS. 15a and b, differ from those for the baseline OE-B sample. Chemical analyses of the friction layers for Examples 6 and 8 reveal that the friction surface and particularly the elevated contact areas are covered by friction layers containing elements originally present in the Fe—Mo Intermetallic and copper oxide additives, as well as in the Fe—Mo Intermetallic, copper oxide and calcium carbonate additives. As demonstrated in FIG. 16a and b, as compared to the baseline OE-B sample, the friction layers for Examples 6 and 8 do not contain carbon and contain significantly less antimony, chromium, zirconium, silicon, aluminum and magnesium.

In other applications, the formulations of Blends A and B could be added to clutch friction linings in the same relative percentages as disclosed above. It is believed that, as in the case of friction linings for brakes, addition of the Fe—Mo Intermetallic and copper oxide or the FE-Mo Intermetallic, copper oxide and calcium carbonate, would increase the coefficient of friction and decrease wear.

Still another embodiment of the present invention comprises adding Blend A and Blend B to brushes used in electric motors. These brushes generally comprise phenolic binders and lubricants, such as carbon, coke and graphite. Addition of Blend A or Blend B would increase the stability of the increase the stability of the brush and reduce brush wear. Blend A would be added to brushes so that the Fe—Mo Intermetallic-copper oxide powders comprised about 1 to about 10 wt. % of the brush composition, preferably from about 1 to about 4 wt. %. The Fe—Mo Intermetallic-copper oxide powders would comprise from about 60 to about 99 wt. % Fe—Mo Intermetallic and from about 1 to about 40 wt. % copper oxide. Alternatively, it may comprise between about 90 and about 99 wt. % Fe—Mo Intermetallic and between about 1 and about 10 wt. % copper oxide, more preferably about 95 wt. % Fe—Mo Intermetallic and about 5 wt. % copper oxide. The particle sizes of the Fe—Mo Intermetallic-copper oxide powders would be in the range of about 2 μm to about 200 μm. Blend B would be added to brushes so that the Fe—Mo Intermetallic-copper oxide-calcium carbonate powders comprised about 1 to about 10 wt. % of the brush composition, preferably about 1 to about 4 wt. %. The Fe—Mo Intermetallic-copper oxide-calcium carbonate powders would comprise from about 50 to about 99 wt. % Fe—Mo Intermetallic, from about 1 to about 50 wt. % copper oxide, and from about 1 to about 10 wt. % calcium carbonate. Alternatively, it may comprise between about 80 and about 95 wt. % Fe—Mo Intermetallic, between about 5 and about 15 wt. % copper oxide and between about 1 and about 5 wt. % calcium carbonate, more preferably about 90 wt. % Fe—Mo Intermetallic, about 5 wt. % copper oxide, and about 5 wt. % calcium carbonate. The particle sizes of the Fe—Mo Intermetallic-copper oxide-calcium carbonate powders would be in the range of about 2 μm to about 200 μm. It is believed that the additions of Blend A and Blend B to electric brushes would reduce wear.

In conclusion, the claimed present invention represents an important development in the field of friction linings. The products according to the present invention are novel, distinctive, and highly beneficial from a technical and utilitarian standpoint. Having herein set forth various embodiments of the present invention, it is anticipated that modifications will naturally occur to those of skill in the art after becoming familiar with the present invention. It is anticipated that such suitable modifications will nonetheless remain within the scope of the invention. The invention shall therefore be construed in accordance with the following claims.

What is claimed is:

1. A motor brush comprising a lubricant and an additive comprising Fe—Mo Intermetallic and copper oxide.

2. The motor brush of claim 1, wherein said additive further comprises calcium carbonate.

3. The motor brush of claim 1 wherein said lubricant comprises carbonaceous material.

4. The motor brush of claim 1, wherein said additive of Fe—Mo Intermetallic and copper oxide comprises about 60 to about 99 weight percent Fe—Mo Intermetallic and about 1 to about 40 weight percent copper oxide.

5. The motor brush of claim 1 wherein said additive of Fe—Mo Intermetallic and copper oxide comprises about 90 to about 99 weight percent Fe—Mo Intermetallic and the remainder copper oxide.

6. The motor brush of claim 1 wherein said motor brush comprises between about 1 and about 10 total weight percent additive.

7. The motor brush of claim 1, wherein said additive comprises particles, said particles ranging in size from about 2 μm to about 200 μm.

8. The motor brush of claim 2 wherein said additive comprises about 50 to about 99 weight percent Fe—Mo Intermetallic, about 1 to about 50 weight percent copper oxide and about 1 to about 10 percent weight percent calcium carbonate.

9. The motor brush of claim 2 wherein the motor brush comprises between about 1 and about 10 total weight percent additive.

10. The motor brush of claim 2, wherein said additive comprises particles, said particles ranging in size from about 2 μm to about 200 μm.

* * * * *